US011455630B2

(12) United States Patent
Wright et al.

(10) Patent No.: US 11,455,630 B2
(45) Date of Patent: Sep. 27, 2022

(54) METHOD FOR SECURE PEER-TO-PEER COMMUNICATION ON A BLOCKCHAIN

(71) Applicant: nChain Holdings Limited, St. John's (AG)

(72) Inventors: Craig Steven Wright, London (GB); Stephane Savanah, London (GB)

(73) Assignee: nChain Holdings Limited, St. John's (AG)

( * ) Notice: Subject to any disclaimer, the term of this patent is extended or adjusted under 35 U.S.C. 154(b) by 935 days.

(21) Appl. No.: 16/092,737

(22) PCT Filed: Apr. 10, 2017

(86) PCT No.: PCT/IB2017/052062
§ 371 (c)(1),
(2) Date: Oct. 10, 2018

(87) PCT Pub. No.: WO2017/178956
PCT Pub. Date: Oct. 19, 2017

(65) Prior Publication Data
US 2019/0130399 A1    May 2, 2019

(30) Foreign Application Priority Data

Apr. 11, 2016   (GB) ..................................... 1606067

(51) Int. Cl.
*G06Q 20/40*    (2012.01)
*G06Q 20/06*    (2012.01)
(Continued)

(52) U.S. Cl.
CPC ......... *G06Q 20/401* (2013.01); *G06F 21/645* (2013.01); *G06Q 20/065* (2013.01);
(Continued)

(58) Field of Classification Search
None
See application file for complete search history.

(56) References Cited

U.S. PATENT DOCUMENTS

| 10,050,779 B2 | 8/2018 | Alness et al. |
| 2015/0206106 A1 | 7/2015 | Yago |

(Continued)

FOREIGN PATENT DOCUMENTS

| AU | 2016100059 A4 | 3/2016 |
| FR | 3018379 A1 | 9/2015 |

(Continued)

OTHER PUBLICATIONS

Pour: "Bitcoin multisig the hard way: Understanding raw P2SH multisig transactions", Dec. 20, 2014, URL: https://www.soroushjp.com/2014/12/20/bitcoin-multisig-the-hard-way-understanding-raw-multisignature-bitcoin-transactions/ (Year: 2014).*

(Continued)

*Primary Examiner* — Steven S Kim
*Assistant Examiner* — Jason B Fenstermacher
(74) *Attorney, Agent, or Firm* — Davis Wright Tremaine LLP

(57) ABSTRACT

The invention comprises a computer-implemented method and system for controlling an exchange process, such as a loan, conducted between at least two parties via a blockchain such as the Bitcoin blockchain. A method according to the invention may comprise the step of generating a first blockchain transaction which includes a redeem script. The redeem script comprises a cryptographic public key associated with an initiating party and metadata which includes a hash of an exchange-related document; a redeem address; and an amount of digital currency. A second blockchain transaction is generated and published to the blockchain so as to spend the digital currency to the redeem address. This (Continued)

provides the advantage that the further transaction will be publically available and thus detectable by other parties once it has been published. The further transaction can provide the information necessary to trigger a response e.g. an offer from another (responding) party who publishes their response on the blockchain. Thus, the exchange process can be implemented via a multi-transaction mechanism on the blockchain rather than an alternative medium. The exchange related document may be an invitation (offer/request) which is stored off-block in a repository such as a Distributed Hash Table (DHT). The invitation may be an invitation to engage in a contract. A smart contract (and associated blockchain transaction) may be formed upon condition that a plurality of participants (e.g. lenders/borrowers) are matched with each other via one or more responses effected via transactions on the blockchain.

12 Claims, 33 Drawing Sheets

(51) Int. Cl.
```
G06Q 40/02      (2012.01)
G06F 21/64      (2013.01)
H04L 9/32       (2006.01)
G06Q 20/36      (2012.01)
H04L 9/06       (2006.01)
H04L 9/00       (2022.01)
```
(52) U.S. Cl.
CPC ....... *G06Q 20/3678* (2013.01); *G06Q 40/025* (2013.01); *H04L 9/0637* (2013.01); *H04L 9/3236* (2013.01); *H04L 9/3242* (2013.01); *H04L 9/3297* (2013.01); *G06Q 2220/10* (2013.01); *H04L 9/50* (2022.05); *H04L 2209/56* (2013.01)

(56) References Cited

U.S. PATENT DOCUMENTS

| | | |
|---|---|---|
| 2015/0262139 A1* | 9/2015 | Shtylman ........... G06Q 20/4014 705/37 |
| 2016/0092988 A1 | 3/2016 | Letourneau |
| 2016/0162897 A1* | 6/2016 | Feeney ................ G06Q 20/065 705/71 |
| 2016/0260171 A1 | 9/2016 | Ford et al. |
| 2016/0321752 A1 | 11/2016 | Tabacco et al. |
| 2017/0046799 A1* | 2/2017 | Chan .................... G06Q 20/065 |
| 2017/0046806 A1* | 2/2017 | Haldenby ............. H04L 63/061 |
| 2017/0187535 A1* | 6/2017 | Middleton ............ H04L 9/3247 |

FOREIGN PATENT DOCUMENTS

| | | |
|---|---|---|
| KR | 10-2010-0035990 A | 4/2010 |
| WO | 2015171580 A1 | 11/2015 |
| WO | 2016170538 A1 | 10/2016 |

OTHER PUBLICATIONS

Reiner et al.: "Bitcoin Wallet Identity Verification Specification", Feb. 27, 2015, XP055245135, Retrieved from the Internet <URL : http://diyhpl.us/~bryan/papers2/bitcoin/armory-verisign-bitcoin-wallet-identity-specification.pdf> [retrieved on Jul. 12, 2021] (Year: 2015).*
Antonopoulos, "Mastering Bitcoin—Unlocking Digital Cryptocurrencies," O'Reilly Media, Inc., Dec. 20, 2014, 282 pages.
Btcjam, "How to Get a Bitcoin Loan," https://btcjam.com/borrow/overview, 2014, 2 pages.
Cawrey, "New Blockchain Startup Brings Contracts Into the Digital Age," CoinDesk, https://www.coindesk.com/markets/2014/12/10/new-blockchain-startup-brings-contracts-into-the-digital-age/, Dec. 10, 2014, 4 pages.
Consensysmedia, "Blockchain Week 2016: EtherLoan—Andres Junge," YouTube, retrieved from https://www.youtube.com/watch?v=ETOmtneplt8, Nov. 1, 2016, 6 pages.
Deloitte, "Over the Horizon: Blockchain and the Future of Financial Infrastructure," Deloitte Touche Tohmatsu Limited, 2016, 21 pages.
Dorier, "Colored Coins and Ricardian Contracts," Coinprism Blog, Dec. 10, 2014 [retrieved Jan. 30, 2017], http://blog.coinprism.com/2014/12/10/colored-coins-and-ricardian-contracts/, 9 pages.
Drwasho, "Peer-to-Peer Lending on OpenBazaar," GitHub, https://gist.github.com/drwasho/2c40b91e169155988618, May 28, 2014, 7 pages.
Forte et al., "Beyond Bitcoin—Part I: A critical look at blockchain-based systems," IACR Cryptology ePrint Archive 2015:1164, Dec. 1, 2015, 34 pages.
Geremia et al., "Are Loans with Enforced Repayment Possible on the Blockchain?," Bitcoin Stack Exchange, https://bitcoin.stackexchange.com/questions/37839/are-loans-with-enforced-repayment-possible-on-the-blockchain, Jun. 17, 2015, 2 pages.
International Search Report and Written Opinion dated Jan. 2015, Patent Application No. PCT/IB2017/052062, 11 pages.
Junge, "Etherloan," Consensys, 2016, 14 pages.
Kiviat, "'Smart' Contract Markets: Trading Derivatives Contracts on the Blockchain," Duke University Law School Graduate Paper, Apr. 2015, 39 pages.
Ko et al., "Design of Monitoring and Analysis System on Blockchain Network," KNOM Conference, 2018, 2 pages.
Nakamoto, "Bitcoin: A Peer-to-Peer Electronic Cash System," Bitcoin, Oct. 31, 2008, https://bitcoin.org/bitcoin.pdf, 9 pages.
Prhana, "Revolving Loan Hack/PoC—TestPlan.md," Retrieved from https://github.com/HumanDynamics/RevolvingLoanHack/blob/master/ProjectPlan/Po, Dec. 5, 2016, 2 pages.
Satoshi et al., "Connection Limits," Bitcoin Forum, Aug. 9, 2010, https://bitcointalk.org/index.php?topic=741.0; prev_next=prev, 2 pages.
Tschorsch et al., "Bitcoin and beyond: A technical survey on decentralized digital currencies," IEEE Communications Surveys and Tutorials 18(3):2084-123, Mar. 2, 2016.
Tuesta et al., "Smart contracts: the ultimate automation of trust?," BBVA Research Financial Inclusion Unit, Oct. 2015, 5 pages.
UK Commercial Search Report dated Dec. 5, 2016, Patent Application No. GB1606067.5, 8 pages.
UK IPO Search Report dated Dec. 7, 2016, Patent Application No. GB1606067.5, 6 pages.

* cited by examiner

| P2P Loan metadata format | | | | |
|---|---|---|---|---|
| Field | Sub-field | Bytes | Value | Comments |
| Loan | ContractType | 4 | 0x0000FF02 | Indicates unsecured loan |
| MetadataA | ContractPointer | 16 | xxxx.xxxx.xxxx.xxxx (...) .xxxx | IPv6 address of the *Service Provider contract* file (not the tokenisation!) |
| | OfferRequestCodes | 1 | 00000010₂ | Request |
| | Conditions | 1 | 00000000₂ | No conditions present |
| | Rate-min | 5 | 0 | Bob is optimistically assuming that someone might not charge for the loan |
| | Rate-max | 5 | 1000 | Maximum rate of 10% (1000 basis points) |
| Loan | ContractHash | 20 | ##################... | Hash of the *Service Provider contract* file (not the tokenisation!) |
| MetadataB | Juristiction | 2 | EN | Specifies that the contract is governed under English law |
| | Options | 2 | 0x0000 | No options specified |
| | RepaymentPeriod | 4 | 12 | Specifies a minimum of 12 periods in the repayment |
| | RepaymentUnit | 1 | 0x02 | Specifies that repayment is by calendar month |
| | RepaymentGap | 1 | 1 | Specifies that a repayment is due each calendar month |
| Loan | RequestItemCode | 16 | BTC | Specifies that the requested item is Bitcoin |
| MetadataD | RequestQtyMin | 8 | 1000000000 | Specifies that the minimum amount required is 10BTC |
| | RequestQtyMax | 8 | 1000000000 | Specifies that the maximum amount required is 10BTC |

Fig. 3

| P2P Loan metadata format | | | | |
|---|---|---|---|---|
| Field | Sub-field | Bytes | Value | Comments |
| Loan MetadataA | ContractType | 4 | 0x0000FF02 | Indicates unsecured loan |
| | ContractPointer | 16 | xxxx.xxxx.xxxx.xxxx (...) .xxxx | IPv6 address of the *Service Provider contract* file (not the tokenisation!) |
| | OfferRequestCodes | 1 | 00000001₂ | Offer |
| | Conditions | 1 | 00000000₂ | No conditions present |
| | Rate-min | 5 | 900 | Minimum rate of 9% |
| | Rate-max | 5 | 0 | |
| Loan MetadataB | ContractHash | 20 | ############... | Hash of the *Service Provider contract* file (not the tokenisation!) |
| | Juristiction | 2 | EN | Specifies that the contract is governed under English law |
| | Options | 2 | 0x0000 | No options specified |
| | RepaymentPeriod | 4 | 60 | Specifies that the maximum repayment period is 60 months |
| | RepaymentUnit | 1 | 0x02 | Specifies that repayment is by calendar month |
| | RepaymentGap | 1 | 1 | Specifies that a repayment is due each calendar month |
| Loan MetadataC | OfferItemCode | 16 | BTC | Specifies that the requested item is Bitcoin |
| | OfferQtyMin | 8 | | No minimum lending amount |
| | OfferQtyMax | 8 | 2000000000 | Specifies that the maximum amount required is 10BTC |

Fig. 4

| Bob's Request | | Alice's Offer | |
|---|---|---|---|
| BOB-S1-T1 | Transaction-ID | ALICE-S1-T1 | Transaction-ID |
| Version number | Version number | Version number | Version number |
| 1 | Number of inputs | 1 | Number of inputs |
| <Bob's previous unspent regular transaction. Assume BTC amount = 5,000 satoshi> | Prev Trans Output | <Alice's previous unspent regular transaction. Assume BTC amount= 10,000 satoshis> | Prev Trans Output |
| IDX-00 | Prev Trans Output index | IDX-00 | Prev Trans Output index |
| Script length | Script length | Script length | Script length |
| Sig-Bob PubK-Bob | ScriptSig | Sig-Alice PubK-Alice | ScriptSig |
| Sequence number | Sequence number | Sequence number | Sequence number |
| 1 | Number of outputs | 1 | Number of outputs |
| 4000 satoshis | Output value | 9,000 | Output value |
| Output script length | Output script length | Output script length | Output script length |
| OP_HASH160 <redeem script hash> OP_EQUAL | Output script | OP_HASH160 <redeem script hash> OP_EQUAL | Output script |
| LockTime | LockTime | LockTime | LockTime |
| BOB-S1-T2 | Transaction-ID | ALICE-S1-T2 | Transaction-ID |
| Version number | Version number | Version number | Version number |
| 1 | Number of inputs | 1 | Number of inputs |
| BOB-S1-T1 | Prev Trans Output | ALICE-S1-T1 | Prev Trans Output |
| IDX-00 | Prev Trans Output index | IDX-00 | Prev Trans Output index |
| Script length | Script length | Script length | Script length |
| Sig-Bob <OP_1 loanMetadataA loanMetadataB loanMetadataD PubK-Bob OP_4 OP_CHECKMULTSIG> | ScriptSig | Sig-Alice <OP_1 loanMetadataA loanMetadataB loanMetadataC PubK-Alice OP_4 OP_CHECKMULTSIG> | ScriptSig |
| Sequence number | Sequence number | Sequence number | Sequence number |
| 1 | Number of outputs | 1 | Number of outputs |
| 3,000 satoshis | Output value | 3,000 satoshis | Output value |
| Output script length | Output script length | Output script length | Output script length |
| OP_DUP OP_HASH160 <PubK-Bob hash> OP_EQUALVERIFY OP_CHECKSIG | Output script | OP_DUP OP_HASH160 <PubK-Alice hash> OP_EQUALVERIFY OP_CHECKSIG | Output script |
| <set to the deadline specified (midnight 31-Dec-2016), expressed as UnixTime> | LockTime | <set to the deadline specified (midnight 31-Dec-2016), expressed as UnixTime> | LockTime |

Fig. 5

| Alice's Loan Advance | |
|---|---|
| ALICE-S1-T3 | Transaction-ID |
| Version number | Version number |
| 1 | Number of inputs |
| <Alice's previous unspent regular transaction. Assume BTC amount= 10,000,000,000 sato | Prev Trans Output |
| IDX-00 | Prev Trans Output index |
| Script length | Script length |
| Sig-Alice PubK-Alice | ScriptSig |
| Sequence number | Sequence number |
| 2 | Number of outputs |
| 1000000000 satochis | Output value |
| Output script length | Output script length |
| OP_HASH160 <redeem script hash> OP_EQUAL | Output script |
| 8999999000 satochis | Output value |
| Output script length | Output script length |
| OP_DUP OP_HASH160 <PubK-Alice hash> OP_EQUALVERIFY OP_CHECKSIG | Output script |
| LockTime | LockTime |

Fig. 6

| Bob's Loan Drawdown | |
|---|---|
| BOB-S1-T3 | Transaction-ID |
| Version number | Version number |
| 1 | Number of inputs |
| ALICE-S1-T3 | Prev Trans Output |
| IDX-00 | Prev Trans Output index |
| Script length | Script length |
| Sig-Bob Sig-Facilitator <OP_2 loanMetadataA loanMetadataB loanMetadataC loanMetadataD PubK-Bob PubK-Facilitator OP_6 OP_CHECKMULTSIG> | ScriptSig |
| Sequence number | Sequence number |
| 1 | Number of outputs |
| 999999000 satochis | Output value |
| Output script length | Output script length |
| OP_DUP OP_HASH160 <PubK-Bob hash> OP_EQUALVERIFY OP_CHECKSIG | Output script |
| <set to the deadline specified (midnight 31-Dec-2016), expressed as UnixTime> | LockTime |

Fig. 7

| Bob's Repayment | |
|---|---|
| BOB-S1-T4 | Transaction-ID |
| Version number | Version number |
| 1 | Number of inputs |
| <Bob's previous unspent regular transaction. Assume BTC amount = 500000000 satoshi> | Prev Trans Output |
| IDX-00 | Prev Trans Output index |
| Script length | Script length |
| Sig-Bob PubK-Bob | ScriptSig |
| Sequence number | Sequence number |
| 2 | Number of outputs |
| 90833333 satochis | Output value |
| Output script length | Output script length |
| OP_HASH160 <redeem script hash> OP_EQUAL | Output script |
| 409165667 satochis | Output value |
| Output script length | Output script length |
| OP_DUP OP_HASH160 <PubK-Bob hash> OP_EQUALVERIFY OP_CHECKSIG | Output script |
| <set to the deadline specified (midnight 31-Dec-2016), expressed as UnixTime> | LockTime |

Fig. 8

| Alice's Repayment Collection | |
|---|---|
| ALICE-S1-T4 | Transaction-ID |
| Version number | Version number |
| 1 | Number of inputs |
| BOB-S1-T4 | Prev Trans Output |
| IDX-00 | Prev Trans Output index |
| Script length | Script length |
| Sig-Alice Sig-Facilitator <OP_2 loanMetadataA loanMetadataB loanMetadataC loanMetadataD PubK-Alice PubK-Facilitator OP_6 OP_CHECKMULTSIG> | ScriptSig |
| Sequence number | Sequence number |
| 1 | Number of outputs |
| 90832333 satochis | Output value |
| Output script length | Output script length |
| OP_DUP OP_HASH160 <PubK-Alice hash> OP_EQUALVERIFY OP_CHECKSIG | Output script |
| LockTime | LockTime |

Fig. 9

P2P Loan metadata format

| Field | Sub-field | Bytes | Value | Comments |
|---|---|---|---|---|
| Loan MetadataA | ContractType | 4 | 0x0000FF02 | Indicates unsecured loan |
| | ContractPointer | 16 | xxxx.xxxx.xxxx.xxxx (...) .xxxx | IPv6 address of the *Service Provider contract* file (not the tokenisation!) |
| | OfferRequestCodes | 1 | 00000010$_2$ | Request |
| | Conditions | 1 | 00000001$_2$ | Condition block E present |
| | Rate-min | 5 | 0 | Bob is optimistically assuming that someone might not charge for the l |
| | Rate-max | 5 | 1000 | Maximum rate of 10% (1000 basis points) |
| Loan MetadataB | ContractHash | 20 | ################... | Hash of the *Service Provider contract* file (not the tokenisation!) |
| | Juristiction | 2 | EN | Specifies that the contract is governed under English law |
| | Options | 2 | 0x0000 | No options specified |
| | RepaymentPeriod | 4 | 12 | Specifies a minimum of 12 periods in the repayment |
| | RepaymentUnit | 1 | 0x02 | Specifies that repayment is by calendar month |
| | RepaymentGap | 1 | 1 | Specifies that a repayment is due each calendar month |
| Loan MetadataD | RequestItemCode | 16 | BTC | Specifies that the requested item is Bitcoin |
| | RequestQtyMin | 8 | 1000000000 | Specifies that the minimum amount required is 10BTC |
| | RequestQtyMax | 8 | 1000000000 | Specifies that the maximum amount required is 10BTC |
| Loan MetadataE | ConditionCode | 2 | 0x0003 | Guarantor provided |
| | ConditionData | 20 | | RIPEMD(SHA256(Eve's Public Key)) |
| | | 10 | | Padding |

Fig. 10

P2P Loan metadata format

| Field | Sub-field | Bytes | Value | Comments |
|---|---|---|---|---|
| Loan MetadataA | ContractType | 4 | 0x0000FF02 | Indicates unsecured loan |
| | ContractPointer | 16 | xxxx.xxxx.xxxx.xxxx (...).xxxx | IPv6 address of the *Service Provider contract* file (not the tokenisation!) |
| | OfferRequestCodes | 1 | $00000001_2$ | Offer |
| | Conditions | 1 | $00000000_2$ | No conditions present |
| | Rate-min | 5 | 900 | Minimum rate of 9% |
| | Rate-max | 5 | 0 | |
| Loan MetadataB | ContractHash | 20 | ################... | Hash of the *Service Provider contract* file (not the tokenisation!) |
| | Juristiction | 2 | EN | Specifies that the contract is governed under English law |
| | Options | 2 | 0x0000 | No options specified |
| | RepaymentPeriod | 4 | 60 | Specifies that the maximum repayment period is 60 months |
| | RepaymentUnit | 1 | 0x02 | Specifies that repayment is by calendar month |
| | RepaymentGap | 1 | 1 | Specifies that a repayment is due each calendar month |
| Loan MetadataC | OfferItemCode | 16 | BTC | Specifies that the requested item is Bitcoin |
| | OfferQtyMin | 8 | | No minimum lending amount |
| | OfferQtyMax | 8 | 2000000000 | Specifies that the maximum amount required is 10BTC |

Fig. 11

| Bob's Request | | Alice's Offer | |
|---|---|---|---|
| BOB-S2-T1 | Transaction-ID | ALICE-S2-T1 | Transaction-ID |
| Version number | Version number | Version number | Version number |
| 1 | Number of inputs | 1 | Number of inputs |
| <Bob's previous unspent regular transaction: Assume BTC amount = 5,000 satoshis> | Prev Trans Output | <Alice's previous unspent regular transaction: Assume BTC amount = 10,000 satoshis> | Prev Trans Output |
| IDX:00 | Prev Trans Output index | IDX:00 | Prev Trans Output index |
| Script length | Script length | Script length | Script length |
| Sig:Bob PubK:Bob | ScriptSig | Sig:Alice PubK:Alice | ScriptSig |
| Sequence number | Sequence number | Sequence number | Sequence number |
| 1 | Number of outputs | 1 | Number of outputs |
| 4000 satoshis | Output value | 9,000 | Output value |
| Output script length | Output script length | Output script length | Output script length |
| OP:HASH160 <redeem script hash> OP_EQUAL | Output script | OP:HASH160 <redeem script hash> OP_EQUAL | Output script |
| LockTime | LockTime | LockTime | LockTime |
| BOB-S2-T2 | Transaction-ID | ALICE-S2-T2 | Transaction-ID |
| Version number | Version number | Version number | Version number |
| 1 | Number of inputs | 1 | Number of inputs |
| BOB-S2-T1 | Prev Trans Output | ALICE-S2-T1 | Prev Trans Output |
| IDX:00 | Prev Trans Output index | IDX:00 | Prev Trans Output index |
| Script length | Script length | Script length | Script length |
| Sig:Bob Sig:Eve <OP_2 loanMetadataA loanMetadataB loanMetadataC PubK:Bob PubK:Eve OP_6 OP_CHECKMULTISIG> | ScriptSig | Sig:Alice <OP_1 loanMetadataA loanMetadataB loanMetadataC PubK:Alice OP_4 OP_CHECKMULTISIG> | ScriptSig |
| Sequence number | Sequence number | Sequence number | Sequence number |
| 1 | Number of outputs | 1 | Number of outputs |
| 3,000 satoshis | Output value | 3,000 satoshis | Output value |
| Output script length | Output script length | Output script length | Output script length |
| OP_DUP OP_HASH160 <PubK:Bob hash> OP_EQUALVERIFY OP_CHECKSIG | Output script | OP_DUP OP_HASH160 <PubK:Alice hash> OP_EQUALVERIFY OP_CHECKSIG | Output script |
| <set to the deadline specified (midnight 31-Dec-2016), expressed as UnixTime> | LockTime | <set to the deadline specified (midnight 31-Dec-2016), expressed as UnixTime> | LockTime |

Fig. 12

| Alice's Loan Advance | |
|---|---|
| ALICE-S2-T3 | Transaction-ID |
| Version number | Version number |
| 1 | Number of inputs |
| <Alice's previous unspent regular transaction. Assume BTC amount= 10,000,000,000 sato | Prev Trans Output |
| IDX-00 | Prev Trans Output index |
| Script length | Script length |
| Sig-Alice PubK-Alice | ScriptSig |
| Sequence number | Sequence number |
| 2 | Number of outputs |
| 100000000 satochis | Output value |
| Output script length | Output script length |
| OP_HASH160 <redeem script hash> OP_EQUAL | Output script |
| 8899999000 satochis | Output value |
| Output script length | Output script length |
| OP_DUP OP_HASH160 <PubK-Alice hash> OP_EQUALVERIFY OP_CHECKSIG | Output script |
| LockTime | LockTime |

Fig. 13

| Bob's Loan Drawdown | |
|---|---|
| BOB-S2-T3 | Transaction-ID |
| Version number | |
| 1 | Version number |
| | Number of inputs |
| ALICE-S2-T3 | Prev Trans Output |
| IDX-00 | Prev Trans Output index |
| Script length | Script length |
| Sig-Bob Sig-Eve Sig-Facilitator <OP_3 loanMetadataA loanMetadataB loanMetadataC loanMetadataD loanMetadataE PubK-Bob PubK-Eve PubK-Facilitator OP_8 OP_CHECKMULTSIG> | ScriptSig |
| Sequence number | Sequence number |
| 1 | Number of outputs |
| 999999000 satochis | Output value |
| Output script length | Output script length |
| OP_DUP OP_HASH160 <PubK-Bob hash> OP_EQUALVERIFY OP_CHECKSIG | Output script |
| <set to the deadline specified (midnight 31-Dec-2016), expressed as UnixTime> | LockTime |

Fig. 14

| Bob's Repayment | |
|---|---|
| BOB-S2-T4 | Transaction-ID |
| Version number | Version number |
| 1 | Number of inputs |
| <Bob's previous unspent regular transaction. Assume BTC amount = 500000000 satoshi> | Prev Trans Output |
| IDX-00 | Prev Trans Output index |
| Script length | Script length |
| Sig-Bob PubK-Bob | ScriptSig |
| Sequence number | Sequence number |
| 2 | Number of outputs |
| 90833333 satochis | Output value |
| Output script length | Output script length |
| OP_HASH160 <redeem script hash> OP_EQUAL | Output script |
| 409165667 satochis | Output value |
| Output script length | Output script length |
| OP_DUP OP_HASH160 <PubK-Bob hash> OP_EQUALVERIFY OP_CHECKSIG | Output script |
| <set to the deadline specified (midnight 31-Dec-2016), expressed as UnixTime> | LockTime |

Fig. 15

| Alice's Repayment Collection | |
|---|---|
| ALICE-S2-T4 | Transaction-ID |
| Version number | Version number |
| 1 | Number of inputs |
| BOB-S2-T4 | Prev Trans Output |
| IDX-00 | Prev Trans Output index |
| Script length | Script length |
| Sig-Alice Sig-Facilitator <OP_2 loanMetadataA loanMetadataB loanMetadataC loanMetadataD loanMetadataE PubK-Alice PubK-Facilitator OP_7 OP_CHECKMULTSIG> | ScriptSig |
| Sequence number | Sequence number |
| 1 | Number of outputs |
| 90832333 satochis | Output value |
| Output script length | Output script length |
| OP_DUP OP_HASH160 <PubK-Alice hash> OP_EQUALVERIFY OP_CHECKSIG | Output script |
| LockTime | LockTime |

Fig. 16

P2P Loan metadata format

| Field | Sub-field | Bytes | Value | Comments |
|---|---|---|---|---|
| Loan MetadataA | ContractType | 4 | 0x0000FF02 | Indicates unsecured loan |
| | ContractPointer | 16 | xxxx.xxxx.xxxx.xxxx (...) .xxxx | IPv6 address of the *Service Provider contract* file (not the tokenisation) |
| | OfferRequestCodes | 1 | 00000010₂ | Request |
| | Conditions | 1 | 00000001₂ | Condition block E present |
| | Rate-min | 5 | 0 | Bob is optimistically assuming that someone might not charge for the l |
| | Rate-max | 5 | 1000 | Maximum rate of 10% (1000 basis points) |
| Loan MetadataB | ContractHash | 20 | ################... | Hash of the Loan *Service Provider contract* file (not the tokenisation!) |
| | Juristiction | 2 | EN | Specifies that the contract is governed under English law |
| | Options | 2 | 0x0000 | No options specified |
| | | 4 | 2075801538 | Specifies a minimum of 12 periods in the repayment |
| | RepaymentUnit | 1 | 0x02 | Specifies that repayment is by calendar month |
| | RepaymentGap | 1 | 1 | Specifies that a repayment is due each calendar month |
| Loan MetadataD | RequestItemCode | 16 | BTC | Specifies that the requested item is Bitcoin |
| | RequestQtyMin | 8 | 1000000000 | Specifies that the minimum amount required is 10BTC |
| | RequestQtyMax | 8 | 1000000000 | Specifies that the maximum amount required is 10BTC |
| Asset MetadataA | ContractType | 4 | 0x<Based on underlying asset> | |
| | ContractPointer | 16 | | Location of supporting contract |
| | ContractData | 12 | | Specific to type of contract being used |
| Asset MetadataB | ContractHash | 20 | ################## | Hash of the Asset Metadata Service Provider Contract |
| | Juristiction | 2 | | Specifies where the contract underpinning the asset is governed |
| | ContractData | 10 | | Specific to type of contract being used |

Fig. 17

| Field | Sub-field | Bytes | Value | Comments |
|---|---|---|---|---|
| Loan | ContractType | 4 | 0x0000FF03 | Indicates secured loan |
| MetadataA | ContractPointer | 16 | xxxx.xxxx.xxxx.xxxx (...) .xxxx | IPv6 address of the *Service Provider contract* file (not the tokenisation!) |
|  | OfferRequestCodes | 1 | 00000001$_2$ | Offer |
|  | Conditions | 1 | 00000000$_2$ | No conditions present |
|  | Rate-min | 5 | 900 | Minimum rate of 9% |
|  | Rate-max | 5 | 0 |  |
| Loan | ContractHash | 20 | ##################... | Hash of the *Service Provider contract* file (not the tokenisation!) |
| MetadataB | Juristiction | 2 | EN | Specifies that the contract is governed under English law |
|  | Options | 2 | 0x0000 | No options specified |
|  | RepaymentPeriod | 4 | 60 | Specifies that the maximum repayment period is 60 months |
|  | RepaymentUnit | 1 | 0x02 | Specifies that repayment is by calendar month |
|  | RepaymentGap | 1 | 1 | Specifies that a repayment is due each calendar month |
| Loan | OfferItemCode | 16 | BTC | Specifies that the requested item is Bitcoin |
| MetadataC | OfferQtyMin | 8 |  | No minimum lending amount |
|  | OfferQtyMax | 8 | 100000000 | Specifies that the maximum amount required is 10BTC |
| Loan | ConditionCode | 2 | 0x0002 | Collateral required |
| MetadataE | PercentageLoan | 5 | 10000 | Measured in basis points of the value of the loan that the collateral mu |
|  | Padding | 25 | 0x00 | Padding |

Fig. 18

P2P Loan metadata format

| Field | Sub-field | Bytes | Value | Comments |
|---|---|---|---|---|
| Loan MetadataA | ContractType | 4 | 0x0000FF02 | Indicates unsecured loan |
| | ContractPointer | 16 | xxxx.xxxx.xxxx.xxxx (...) .xxxx | IPv6 address of the *Service Provider contract* file (not the tokenisation!) |
| | OfferRequestCodes | 1 | $00000001_2$ | Offer |
| | Conditions | 1 | $00000000_2$ | No conditions present |
| | Rate-min | 5 | 975 | Minimum rate of 9% |
| | Rate-max | 5 | 0 | |
| Loan MetadataB | ContractHash | 20 | ################... | Hash of the *Service Provider contract* file (not the tokenisation!) |
| | Juristiction | 2 | EN | Specifies that the contract is governed under English law |
| | Options | 2 | 0x0000 | No options specified |
| | RepaymentPeriod | 4 | 60 | Specifies that the maximum repayment period is 60 months |
| | RepaymentUnit | 1 | 0x02 | Specifies that repayment is by calendar month |
| | RepaymentGap | 1 | 1 | Specifies that a repayment is due each calendar month |
| Loan MetadataC | OfferItemCode | 16 | BTC | Specifies that the requested item is Bitcoin |
| | OfferQtyMin | 8 | | No minimum lending amount |
| | OfferQtyMax | 8 | 2000000000 | Specifies that the maximum amount required is 10BTC |

| Bob's Supply of Collateral | |
|---|---|
| BOB-S3-T3 | Transaction-ID |
| Version number | Version number |
| 2 | Number of inputs |
| <Bob's collateral using BTC as a transport mechanism, assume 5,000 satoshi> | Prev Trans Output |
| IDX-00 | Prev Trans Output index |
| Script length | Script length |
| Sig-Bob Sig-Issuer <OP_2 assetMetadataA assetMetadataB PubK-Bob PubK-Issuer OP_4 OP_CHECKMULTSIG> | ScriptSig |
| <Bob's standard BTC to cover the mining fee> | Prev Trans Output |
| IDX-00 | Prev Trans Output index |
| Script length | Script length |
| Sig-Bob PubK-Bob | ScriptSig |
| 1 | Number of outputs |
| 5000 satoshis | Output value |
| Output script length | Output script length |
| OP_HASH160 <redeem script hash> OP_EQUAL | Output script |
| LockTime | LockTime |

Fig. 21

| Alice's Loan Advance | | Eve's Loan Advance | |
|---|---|---|---|
| ALICE-S3-T3 | Transaction-ID | EVE-S3-T3 | Transaction-ID |
| 1 | Version number | 1 | Version number |
| 1 | Number of inputs | 1 | Number of inputs |
| <Alice's previous unspent regular transaction. Assume BTC amount= 10,000,000,000 sato | Prev Trans Output | <Alice's previous unspent regular transaction. Assume BTC amount= 10,000,000,000 sato | Prev Trans Output |
| IDX-00 | Prev Trans Output index | IDX-00 | Prev Trans Output index |
|  | Script length |  | Script length |
| Sig-Alice PubK-Alice | ScriptSig | Sig-Eve PubK-Eve | ScriptSig |
|  | Sequence number |  | Sequence number |
| 2 | Number of outputs | 2 | Number of outputs |
| 1000000000 satochis | Output value | 2000000000 satochis | Output value |
|  | Output script length |  | Output script length |
| OP_HASH160 <redeem script hash> OP_EQUAL | Output script | OP_HASH160 <redeem script hash> OP_EQUAL | Output script |
| 8999999000 satochis | Output value | 7999999000 satochis | Output value |
|  | Output script length |  | Output script length |
| OP_DUP OP_HASH160 <PubK-Alice hash> OP_EQUALVERIFY OP_CHECKSIG | Output script | OP_DUP OP_HASH160 <PubK-Eve hash> OP_EQUALVERIFY OP_CHECKSIG | Output script |
|  | LockTime |  | LockTime |

Fig.22

| Bob's Loan Drawdown | |
|---|---|
| BOB-S3-T4 | Transaction-ID |
| Version number | Version number |
| 1 | Number of inputs |
| ALICE-S3-T3 | Prev Trans Output |
| IDX-00 | Prev Trans Output index |
| Script length | Script length |
| Sig-Bob Sig-Facilitator <OP_2 loanMetadataA loanMetadataB loanMetadataC loanMetadataD loanMetadataE PubK-Bob PubK-Facilitator OP_7 OP_CHECKMULTSIG> | ScriptSig |
| EVE-S3-T3 | Prev Trans Output |
| IDX-00 | Prev Trans Output index |
| Script length | Script length |
| Sig-Bob Sig-Facilitator <OP_2 loanMetadataA loanMetadataB loanMetadataC loanMetadataD loanMetadataE PubK-Bob PubK-Facilitator OP_7 OP_CHECKMULTSIG> | ScriptSig |
| Sequence number | Sequence number |
| 1 | Number of outputs |
| 2,999,999,000 | Output value |
| Output script length | Output script length |
| OP_DUP OP_HASH160 <PubK-Bob hash> OP_EQUALVERIFY OP_CHECKSIG | Output script |
| <set to the deadline specified (midnight 31-Dec-2016), expressed as UnixTime> | LockTime |

Fig. 23

| Bob's Repayment | |
|---|---|
| BOB-S3-T5 | Transaction-ID |
| Version number | Version number |
| 1 | Number of inputs |
| <Bob's previous unspent regular transaction. Assume BTC amount = 500000000 satoshi> | Prev Trans Output |
| IDX-00 | Prev Trans Output index |
| Script length | Script length |
| Sig-Bob PubK-Bob | ScriptSig |
| Sequence number | Sequence number |
| 3 | Number of outputs |
| 91458333 satochis | Output value |
| Output script length | Output script length |
| OP_HASH160 <redeem script hash> OP_EQUAL | Output script |
| 18291667 satochis | Output value |
| Output script length | Output script length |
| OP_HASH160 <redeem script hash> OP_EQUAL | Output script |
| 390249000 satochis | Output value |
| Output script length | Output script length |
| OP_DUP OP_HASH160 <PubK-Bob hash> OP_EQUALVERIFY OP_CHECKSIG | Output script |
| <set to the deadline specified (midnight 31-Dec-2016), expressed as UnixTime> | LockTime |

Fig. 24

| Alice's Repayment Collection | | Eve's Repayment Collection | |
|---|---|---|---|
| ALICE-S3-T4 | Transaction-ID | EVE-S3-T4 | |
| Version number | Version number | | |
| 1 | Number of inputs | 1 | |
| BOB-S3-T5 | Prev Trans Output | BOB-S3-T5 | |
| IDX-00 | Prev Trans Output index | IDX-01 | |
| Script length | Script length | | |
| Sig-Alice Sig-Facilitator <OP_2 loanMetadataA loanMetadataB loanMetadataC loanMetadataD loanMetadataE PubK-Alice PubK-Facilitator OP_7 OP_CHECKMULTSIG> | ScriptSig | Sig-Eve Sig-Facilitator <OP_2 loanMetadataA loanMetadataB loanMetadataC loanMetadataD loanMetadataE PubK-Eve PubK-Facilitator OP_7 OP_CHECKMULTSIG> | |
| | Sequence number | | |
| 1 | Number of outputs | 1 | |
| 91457333 satochis | Output value | 182915667 satochis | |
| | Output script length | | Output script length |
| OP_DUP OP_HASH160 <PubK-Alice hash> OP_EQUALVERIFY OP_CHECKSIG | Output script | OP_DUP OP_HASH160 <PubK-Eve hash> OP_EQUALVERIFY OP_CHECKSIG | |
| LockTime | LockTime | LockTime | |

Fig. 25

| Bob's reclaim of collateral | |
|---|---|
| BOB-S3-T6 | Transaction-ID |
| Version number | Version number |
| 2 | Number of inputs |
| BOB-S3-T3 | Prev Trans Output |
| IDX-00 | Prev Trans Output index |
| Script length | Script length |
| Sig-Bob Sig-Issuer Sig-Facilitator <OP_3 assetMetadataA assetMetadataB PubK-Bob PubK-Issuer PubK-Facilitator OP_5 OP_CHECKMULTSIG> | ScriptSig |
| <Bob's standard BTC to cover the mining fee> | Prev Trans Output |
| IDX-00 | Prev Trans Output index |
| Script length | Script length |
| Sig-Bob PubK-Bob | ScriptSig |
| Sequence number | Sequence number |
| 1 | Number of outputs |
| 5000 satoshis | Output value |
| Output script length | Output script length |
| OP_HASH160 <redeem script hash> OP_EQUAL | Output script |
| LockTime | LockTime |

Fig. 26

| P2P Loan metadata format | | | | |
|---|---|---|---|---|
| Field | Sub-field | Bytes | Value | Comments |
| Loan MetadataA | ContractType | 4 | 0x0000FF02 | Indicates unsecured loan |
| | ContractPointer | 16 | xxxx.xxxx.xxxx.xxxx (...) .xxxx | IPv6 address of the *Service Provider contract* file (not the tokenisation) |
| | OfferRequestCodes | 1 | $00000010_2$ | Request |
| | Conditions | 1 | $00000001_2$ | Condition block E present |
| | Rate-min | 5 | 0 | Bob is optimistically assuming that someone might not charge for the l |
| | Rate-max | 5 | 1000 | Maximum rate of 10% (1000 basis points) |
| Loan MetadataB | ContractHash | 20 | ############... | Hash of the Loan *Service Provider contract* file (not the tokenisation!) |
| | Juristiction | 2 | EN | Specifies that the contract is governed under English law |
| | Options | 2 | 0x0000 | No options specified |
| | | 4 | 12 | Specifies a minimum of 12 periods in the repayment |
| | RepaymentUnit | 1 | 0x02 | Specifies that repayment is by calendar month |
| | RepaymentGap | 1 | 1 | Specifies that a repayment is due each calendar month |
| Loan MetadataD | RequestItemCode | 16 | GBP | Specifies that the requested item is Bitcoin |
| | RequestQtyMin | 8 | 1500000 | Specifies the amount in minor currency units |
| | RequestQtyMax | 8 | 1500000 | Specifies the amount in minor currency units |

| P2P Loan metadata format | | | | |
|---|---|---|---|---|
| Field | Sub-field | Bytes | Value | Comments |
| Loan MetadataA | ContractType | 4 | 0x0000FF03 | Indicates secured loan |
| | ContractPointer | 16 | xxxx.xxxx.xxxx.xxxx (...) .xxxx | IPv6 address of the *Service Provider contract* file (not the tokenisation) |
| | OfferRequestCodes | 1 | $00000001_2$ | Offer |
| | Conditions | 1 | $00000000_2$ | No conditions present |
| | Rate-min | 5 | 1000 | Minimum rate of 10% |
| | Rate-max | 5 | 0 | |
| Loan MetadataB | ContractHash | 20 | ############... | Hash of the *Service Provider contract* file (not the tokenisation) |
| | Juristiction | 2 | EN | Specifies that the contract is governed under English law |
| | Options | 2 | 0x0000 | No options specified |
| | RepaymentPeriod | 4 | 12 | Specifies that the maximum repayment period is 60 months |
| | RepaymentUnit | 1 | 0x02 | Specifies that repayment is by calendar month |
| | RepaymentGap | 1 | 1 | Specifies that a repayment is due each calendar month |
| Loan MetadataC | OfferItemCode | 16 | GBP | Specifies that the requested item is Bitcoin |
| | OfferQtyMin | 8 | 1500000 | Specifies the amount in minor currency units |
| | OfferQtyMax | 8 | 1500000 | Specifies the amount in minor currency units |
| Asset MetadataA | ContractType | 4 | 0x<Based on underlying asset> | |
| | ContractPointer | 16 | | Location of supporting contract |
| | ContractData | 12 | | Specific to type of contract being used |
| Asset MetadataB | ContractHash | 20 | ############ | Hash of the *Asset Metadata Service Provider Contract* |
| | Juristiction | 2 | | Specifies where the contract underpinning the asset is governed |
| | ContractData | 10 | | Specific to type of contract being used |

| Bob's Request | | Alice's Offer | |
|---|---|---|---|
| BOB-S4-T1 | Transaction-ID | ALICE-S4-T1 | Transaction-ID |
| Version number | Version number | Version number | Version number |
| 1 | Number of inputs | 1 | Number of inputs |
| <Bob's previous unspent regular transaction. Assume BTC amount = 5,000 satoshi> | Prev Trans Output | <Alice's previous unspent regular transaction. Assume BTC amount = 10,000 satoshis> | Prev Trans Output |
| IDX-00 | Prev Trans Output index | IDX-00 | Prev Trans Output index |
| | Script length | | Script length |
| Sig-Bob PubK-Bob | ScriptSig | Sig-Alice PubK-Alice | ScriptSig |
| | Sequence number | | Sequence number |
| 1 | Number of outputs | 1 | Number of outputs |
| 4000 satoshis | Output value | 9,000 | Output value |
| | Output script length | | Output script length |
| OP_HASH160 <redeem script hash> OP_EQUAL | Output script | OP_HASH160 <redeem script hash> OP_EQUAL | Output script |
| | LockTime | | LockTime |
| BOB-S4-T2 | Transaction-ID | ALICE-S4-T2 | Transaction-ID |
| Version number | Version number | Version number | Version number |
| 1 | Number of inputs | 1 | Number of inputs |
| BOB-S4-T1 | Prev Trans Output | ALICE-S4-T1 | Prev Trans Output |
| IDX-00 | Prev Trans Output index | IDX-00 | Prev Trans Output index |
| | Script length | | Script length |
| Sig-Bob <OP_1 loanMetadataA loanMetadataB loanMetadataD PubK-Bob OP_4 OP_CHECKMULTSIG> | ScriptSig | Sig-Alice <OP_1 loanMetadataA loanMetadataB loanMetadataC PubK-Alice OP_4 OP_CHECKMULTSIG> | ScriptSig |
| | Sequence number | | Sequence number |
| 1 | Number of outputs | 1 | Number of outputs |
| 3,000 satoshis | Output value | 3,000 satoshis | Output value |
| | Output script length | | Output script length |
| OP_DUP OP_HASH160 <PubK-Bob hash> OP_EQUALVERIFY OP_CHECKSIG | Output script | OP_DUP OP_HASH160 <PubK-Alice hash> OP_EQUALVERIFY OP_CHECKSIG | Output script |
| <set to the deadline specified (midnight 31-Dec-2016), expressed as UnixTime> | LockTime | <set to the deadline specified (midnight 31-Dec-2016), expressed as UnixTime> | LockTime |

Fig. 29

| Alice's Loan Advance | |
|---|---|
| ALICE-S4-T3 | Transaction-ID |
| Version number | Version number |
| 2 | Number of inputs |
| <Alice's previous unspent regular transaction in 'pure' BTC to cover mining fee> | Prev Trans Output |
| IDX-00 | Prev Trans Output index |
| Script length | Script length |
| Sig-Alice PubK-Alice | ScriptSig |
| <Alice's asset account covered by 10,000,000,000 satoshis> | |
| IDX-00 | |
| Script length | Script length |
| Sig-Alice Sig-Issuer <OP_2 assetMetadataA assetMetadataB PubK-Alice PubK-Issuer OP_4 OP_CHECKMULTSIG> | Sequence number |
| 2 | Number of outputs |
| 100000000 satoshis | Output value |
| Output script length | Output script length |
| OP_HASH160 <redeem script hash> OP_EQUAL | Output script |
| 8999999000 satoshis | Output value |
| Output script length | Output script length |
| OP_HASH160 <redeem script hash> OP_EQUAL | Output script |
| LockTime | LockTime |

Fig. 30

| Bob's Loan Drawdown | |
|---|---|
| BOB-S4-T3 | Transaction-ID |
| Version number | Version number |
| 1 | Number of inputs |
| ALICE-S4-T3 | Prev Trans Output |
| IDX-00 | Prev Trans Output index |
| Script length | Script length |
| Sig-Bob Sig-Facilitator Sig-Issuer <OP_3 loanMetadataA loanMetadataB loanMetadataC loanMetadataD assetMetadataA assetMetadataB PubK-Bob PubK-Facilitator PubK-Issuer OP_9 OP_CHECKMULTSIG> | ScriptSig |
| Sequence number | Sequence number |
| 1 | Number of outputs |
| 999999000 satochis | Output value |
| Output script length | Output script length |
| OP_HASH160 <redeem script hash> OP_EQUAL | Output script |
| <set to the deadline specified (midnight 31-Dec-2016), expressed as UnixTime> | LockTime |

Fig. 31

| Bob's Repayment | |
|---|---|
| BOB-S4-T4 | Transaction-ID |
| Version number | Version number |
| 1 | Number of inputs |
| <Bob's previous unspent regular transaction. Assume BTC amount = 500000000 satoshi> | Prev Trans Output |
| IDX-00 | Prev Trans Output index |
| Script length | Script length |
| Sig-Bob PubK-Bob | ScriptSig |
| Sequence number | Sequence number |
| 2 | Number of outputs |
| 90833333 satochis | Output value |
| Output script length | Output script length |
| OP_HASH160 <redeem script hash> OP_EQUAL | Output script |
| 409165667 satochis | Output value |
| Output script length | Output script length |
| OP_DUP OP_HASH160 <PubK-Bob hash> OP_EQUALVERIFY OP_CHECKSIG | Output script |
| <set to the deadline specified (midnight 31-Dec-2016), expressed as UnixTime> | LockTime |

| Alice's Repayment Collection | |
|---|---|
| ALICE-S4-T4 | Transaction-ID |
| Version number | Version number |
| 1 | Number of inputs |
| BOB-S4-T4 | Prev Trans Output |
| IDX-00 | Prev Trans Output index |
| Script length | Script length |
| Sig-Alice Sig-Facilitator Sig-Issuer <OP_3 loanMetadataA loanMetadataB loanMetadataC loanMetadataD assetMetadataA assetMetadataB PubK-Alice PubK-Facilitator PubK-Issuer OP_9 OP_CHECKMULTSIG> | ScriptSig |
| Sequence number | Sequence number |
| 1 | Number of outputs |
| 90832333 satochis | Output value |
| Output script length | Output script length |
| OP_HASH160 <redeem script hash> OP_EQUAL | Output script |
| LockTime | LockTime |

METHOD FOR SECURE PEER-TO-PEER COMMUNICATION ON A BLOCKCHAIN

This invention relates generally to a tokenisation method and a tokenisation system. In particular, it relates to the transfer of contracts. It may be suited for use with a P2P lending process. It may be used in conjunction with any peer-to-peer distributed network. This may be blockchain-related technology, including (but not limited to) the Bitcoin Blockchain.

In this document we use the term 'blockchain' to include all forms of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a peer-to-peer, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc.) while being more versatile in their applications.

One area of current research is the use of the blockchain for the implementation of "smart contracts". These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results. Another area of blockchain-related interest is the use of 'tokens' (or 'coloured coins') to represent and transfer real-world entities via the blockchain. A potentially sensitive or secret item can be represented by the token which has no discernable meaning or value. The token thus serves as an identifier that allows the real-world item to be referenced from the blockchain.

The present invention incorporates these concepts to provide a blockchain-based mechanism which enables secure electronic communication and transfer between different parties. One advantage of the invention is that it enables the construction and use of a secure communication channel between the parties, and incorporation of a securely published contract without the need for control, management, intervention or participation by additional parties or entities to oversee the channel.

One illustrative application area for such a solution is that of peer-to-peer lending. Lending is an integral part of the financial services marketplace, allowing borrowers to receive funds from lenders in return for subsequent payment of those advanced funds. Traditional lending via a financial institution such as a bank has, in recent years, been extended through peer-to-peer (P2P) lending where individuals lend pooled finds to a borrower in general for a higher individual return, but with increased risk of loss of the advanced funds.

There are a number of P2P pools with their own bespoke trading exchanges requiring individual registration onto those applications in order to participate in the P2P lending process (e.g. Zopa, Funding circle). These loans are underpinned by the traditional banking network and infrastructure within the territory that they operate. Therefore, the present systems for P2P lending are restrictive and complex by nature.

It would be advantageous to provide an alternative solution. Benefits of this solution could include, for example, elimination of the need for local bespoke exchanges whilst enabling sophisticated lending processes to be carried out. Known benefits of the blockchain (such as its tamper-proof, permanent record of transactions) could be harnessed to advantage. This solution would provide an entirely new architecture and technical platform. Such an improved solution has now been devised.

Thus, in accordance with the present invention there is provided a method and system as defined in the appended claims.

Therefore, in accordance with the invention there may be provided a method and corresponding system for controlling the performance of a process conducted via (i.e. using) a blockchain. The block chain may or may not be the Bitcoin blockchain. The process may be a communication, exchange or transfer process. It may comprise the transfer, communication or exchange of a digital asset, or any type of asset which is referenced or represented on the blockchain. The controlled process may, for example, be a lending process. It may be a peer-to-peer lending process conducted between a plurality of blockchain users. The terms "user" or "party" may refer to a human or machine-based entity. Each blockchain user may use suitably configured hardware and software to participate in the process (e.g. a computer with a bitcoin client installed on it). The invention may also be referred to as a security solution, system and/or method as it comprises the use of cryptographic techniques to ensure the secure communication/transfer between parties.

The invention may comprise a method substantially as set out in tables 1 to 8 included herein, and/or in the use cases/scenarios as set out herein.

Additionally or alternatively, the invention may comprise a computer-implemented method arranged. It may be arranged to control an exchange process conducted between at least two parties via a blockchain. The method may comprise the steps:

generating a first blockchain transaction comprising:
  a redeem script comprising a cryptographic public key associated with an initiating party and metadata which includes a hash of a document;
  a redeem address; and
  an amount of digital currency;
generating a second blockchain transaction to spend the digital currency to the redeem address.

The document may be an exchange-related document. It may relate to an exchange or transfer to be conducted or communicated between the parties. The exchange may relate to any type of asset, digital or otherwise.

Therefore, the invention may include the step of using a further blockchain transaction to spend the currency. This provides the advantage that the further transaction will be publically available and thus detectable by other parties once it has been published to the blockchain. The further transaction can provide the information necessary to trigger a response e.g. an offer from another party. Thus, the exchange process can be implemented via a multi-transaction mechanism on the blockchain rather than an alternative medium. The first and second transaction may be generated by the same party. The transaction(s) may be multi-signature blockchain transactions.

The first and/or second transaction may provide access from the blockchain to an invitation (offer/request) which is stored off-block. The invitation may be an invitation to engage in a contract.

The exchange may be a loan or related to a loan. A smart contract (and associated blockchain transaction) may be formed upon condition that a plurality of participants e.g. lenders/borrowers are matched with each other via one or more responses effected via transactions on the blockchain.

The invitation may be a structured document stored in electronic form.

The digital currency may or may not be Bitcoin (BTC). The repository may be any kind of computer-based resource which is able to store the invitation. The repository may comprise a server or be housed on a server. The repository may be separate from the blockchain. Therefore, the invitation may be stored off-block. The reference to the location may comprise a URI or other means for identifying the location of the invitation. The invitation may be publically available, or some security mechanism may be used to restrict access to the contents of the invitation to authorised parties. The invitation may be stored in a centralised location or may be distributed. In a preferred embodiment, the invitation may be publically accessible and stored on a Distributed Hash Table (DHT).

The currency may be any kind of digital currency. It may be Bitcoin. It may be tokenised currency. The transfer may be a transfer of any type of goods or service. Preferably, the transfer is conducted via the blockchain using a transaction (Tx).

The initiating party may be a potential borrower or lender. The invitation may be a document or file which comprises information relating to a request or offer for a loan. It may be a digital file.

The method may include the step of publishing the first transaction to a blockchain. The invitation may comprise:
  information relating to a repayment schedule associated with the transfer; and/or a second party associated with the initiating party.

The method may include the step of:
  generating a response, the response being associated with a responding party and comprising a reference to the invitation;
  storing the response in a computer-based repository;
  generating a further (multi-signature) blockchain transaction comprising:
    a redeem script comprising a cryptographic public key associated with the responding party and metadata which includes a hash of the response and a reference to its location in the repository; and an amount of digital currency.

The response may be stored in the same repository as the invitation, or a different repository. The response may be an electronic file. The repository which stores the invitation and/or response may be a distributed hash table (DHT).

The method may include the step of:
  generating an exchange schedule associated with the invitation or response, the schedule comprising data relating to at least one exchange amount and/or exchange date;
  generating a P2SH address for each exchange in the schedule.

The exchange schedule may be a repayment schedule. The exchange amount and/or dates may relate to repayments of a loan amount associated with the invitation or response.

The method may include the step of publishing a transaction to the blockchain to make an exchange in accordance with the exchange schedule.

The method may further comprise the step of monitoring the blockchain to identify at least one transaction comprising metadata associated with the invitation and/or response.

At least one monitoring step may be performed substantially as set out in table 2 below.

The method may further comprise the step of:
  monitoring the blockchain to identify at least one transaction comprising metadata associated with the invitation and at least one transaction comprising metadata associated with the response;
  comparing the metadata from the identified transactions to determine whether there is a correspondence between the metadata.

At least two blockchain transactions may be compared to assess whether there is a match (correspondence) between data contained within the invitation and the response.

The method may further comprise the step of:
  generating a smart contract associated with the initiating and responding party, and comprising data relating to:
    the invitation and/or the response;
    the initiating party and/or responding party;
    a third party such as a guarantor and/or a facilitator;
    at least one asset to be transferred from one party to another;
    a repayment schedule.

At least one step may be performed substantially as set out in table 4 below.

The smart contact may be generated if it is determined that there is a match (correspondence) between data contained within the invitation and the response. The smart contract may be generated by an automated process i.e. by computer.

The method may further comprise the step of:
publishing the smart contract to a repository; and/or
publishing a transaction to the blockchain, the transaction comprising a redeem script comprising at least one public key and a reference to the smart contract.

The invention may also comprise a computer-implemented system arranged to perform the method of any preceding claim and comprising:
a blockchain;
a plurality of computing devices arranged for communication with the blockchain.

Additionally or alternatively, the invention may provide a computer-implemented system arranged and configured to perform any or all of the method steps described above.

Additionally or alternatively, it may comprise a computer-implemented system arranged to control a lending process conducted between at least two parties via a blockchain, the system comprising:
a computer-based repository storing an invitation for a transfer between two or more parties; wherein the contract is associated with an initiating party;
a blockchain comprising a first multi-signature transaction comprising:
a redeem script comprising a cryptographic public key associated with the initiating party and metadata which includes a hash of the invitation and a reference to its location in the repository; and
an amount of digital currency.

Any feature described herein in relation to one aspect or embodiment of the invention may also be used in relation to any other aspect or embodiment. For example, a feature described in relation to the method may also apply to the system and vice versa.

Thus, the invention may provide various technical benefits including, but not limited to, the following:
It enables a secure communication channel to be set up between parties on a peer-to-peer network
The communication can be conducted securely between the parties themselves without the need for intervention by a third party;
it enables the control and implementation of a multi-party exchange or transfer conducted via a blockchain;
transfers (such as, for example, repayments) can be made via the blockchain providing a permanent, tamper-proof and timestamped record.

These and other aspects of the present invention will be apparent from and elucidated with reference to, the embodiment described herein.

An embodiment of the present invention will now be described, by way of example only, and with reference to the accompany drawings, in which:

FIG. 3 illustrates metadata for Bob who would like to borrow 10 bitcoins;

FIG. 4 illustrates metadata for Alice who would like to lend 20 bitcoins;

FIG. 5 illustrates the matching of transactions which publish the willingness of the two participants to enter into a loan on mutually agreeable terms;

FIG. 6 illustrates the advancement of a loan by Alice to be drawn down by Bob;

FIG. 7 illustrates an input from Bob to enable him to draw down the funds advanced by Alice;

FIG. 8 illustrates an input from Bob to repay Alice;

FIG. 9 illustrates an input from Alice to receive Bob's repayment;

FIG. 10 illustrates metadata for Bob who wants to borrow 10 bitcoins, and who intends to provide a guarantor;

FIG. 11 illustrates metadata for Alice who would like to lend 20 bitcoins;

FIG. 12 illustrates the matching of transactions which publish the willingness of Bob and Alice to enter into a loan on mutually agreeable terms;

FIG. 13 illustrates the advancement of a loan by Alice to be drawn down by Bob;

FIG. 14 illustrates an input from Bob to enable him to draw down the funds advanced by Alice;

FIG. 15 illustrates an input from Bob to repay Alice;

FIG. 16 illustrates an input from Alice to receive Bob's repayment;

FIG. 17 illustrates metadata for Bob who wants to borrow 30 bitcoins;

FIG. 18 illustrates metadata for Alice who would like to lend 10 bitcoins;

FIG. 19 illustrates metadata for Eve who would like to lend 20 bitcoins;

FIG. 20 illustrates a matching process which takes place which publishes the willingness of the three participants to enter into a loan on mutually agreeable terms.

FIG. 21 illustrates Bob locking the required collateral into an escrow account owned by the facilitator;

FIG. 22 illustrates the construction of a contract document containing the negotiated terms;

FIG. 23 illustrates an input from Bob to drawdown a loan advance provided by Eve and Alice;

FIG. 24 illustrates an input from Bob to repay Alice and Eve;

FIG. 25 illustrates an output repaying Alice and Eve;

FIG. 26 illustrates an input from Bob to reclaim collateral;

FIG. 27 illustrates metadata from Bob to indicate Bob's desire to borrow £15,000;

FIG. 28 illustrates metadata from Alice indicating a desire to lend £15,000;

FIG. 29 illustrates a matching process which publishes the willingness of Bob and Alice to enter into a loan on mutually agreeable terms;

FIG. 30 illustrates the construction of a contract document containing the negotiated terms;

FIG. 31 illustrates an input from Bob to draw down a loan advance from Alice;

FIG. 32 illustrates an input from Bob to make a repayment to Alice;

FIG. 33 illustrates an input from Alice to collect a repayment from Bob.

Figure 1:
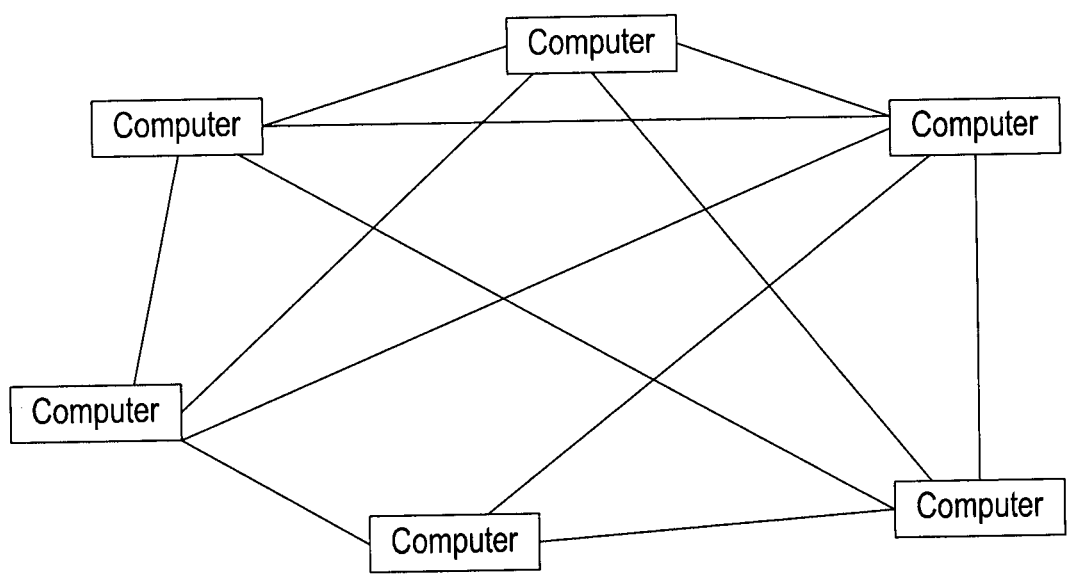
FIG. 1 illustrates a P2P network comprising a plurality of computing devices, as is known in the prior art. The present invention could be implemented using a P2P system.
Figure 2:
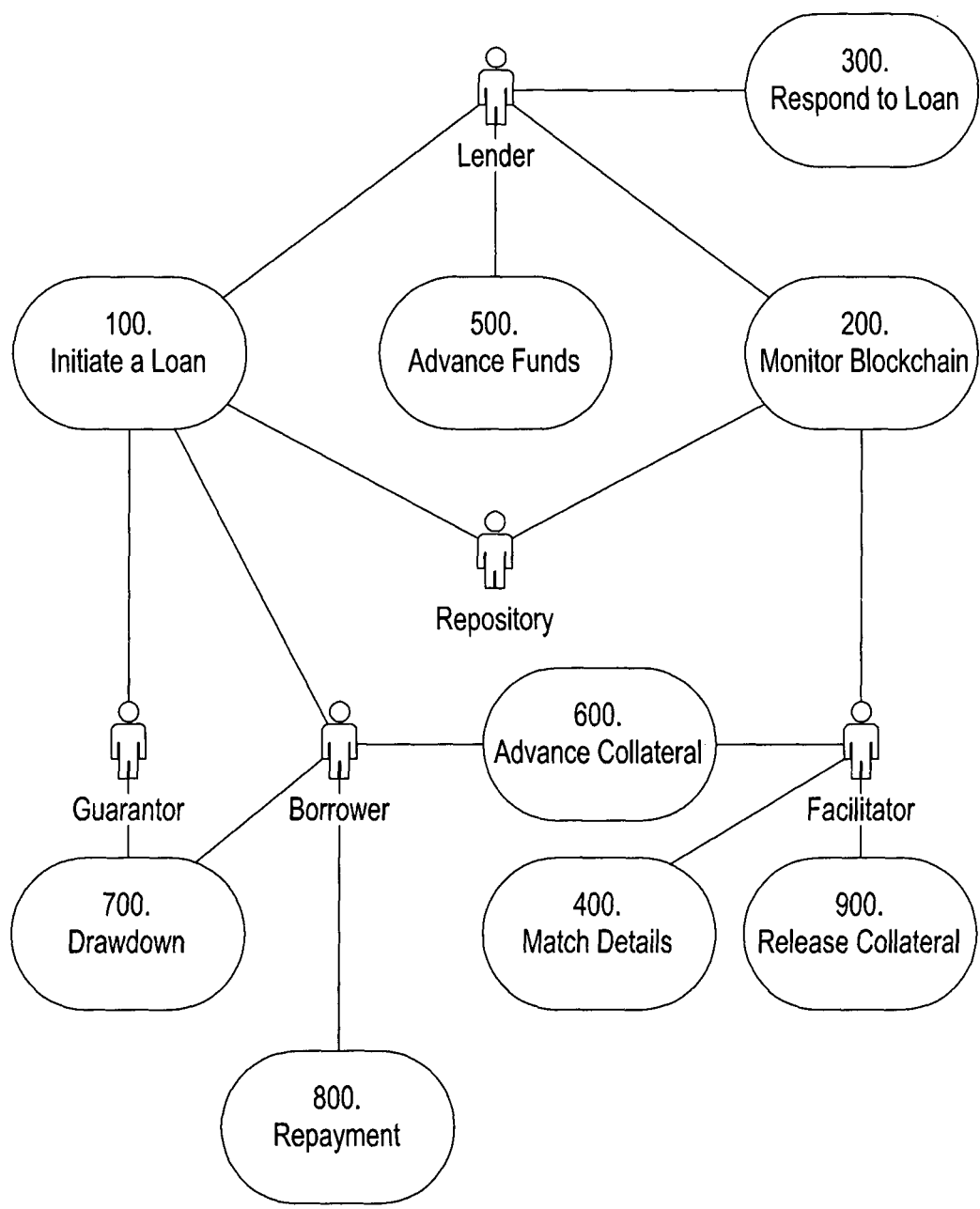
FIG. 2 illustrates the relative positioning of each of the parties in the described key use cases.

FIG. 1 shows a P2P network in accordance with the prior art. A P2P system is a distributed architecture which shares work and tasks between interconnected computing devices, which are known as 'nodes' or 'peers'. Such a network is decentralised in that no individual computer is designated as being 'in charge'. In recent years, P2P architecture has been used for the implementation of the Bitcoin Blockchain and Bitcoin-inspired adaptations.

The following terms may be used herein and may be construed in accordance with the following meanings:

| Name | Type |
|---|---|
| Borrower | The Borrower is an actor or entity, which may be an individual or corporate entity, or computer-based resource, which is seeking the loan of money or other assets for a period of time. More than one Borrower can be engaged in a given loan. |
| Guarantor | The Guarantor is an actor/entity (or one of the actors) that is underwriting the loan in circumstances where the Borrower's credit rating (as determined by the Lender's) is perceived to be too weak to support the advancement of the loan without this additional surety. |
| Lender | The Lender is an actor/entity, which may be an individual or corporate entity, or computer-based resource, which is advancing the loan of money or other assets for a period of time in return for a set of repayments. |
| Facilitator | The Facilitator is an actor/entity, which may be an individual or corporate entity, which acts as an intermediary between the Lender(s) and Borrower(s) in the arrangement, or ongoing management of the Loan. |
| Repository | The Repository is an actor, which may be an individual or corporate entity, or a computer-implemented resource, which acts as a trusted repository for any documents (e.g. offer, request, rule or contract) which is referenced within the loan arrangement or management. |
| Document | The Document is an entity that contains structured information relevant or related to the loan process; it may be a digital document e.g. a computer file; it may be a structured document |
| Offer Request | This is a specialised type of Document that contains details of the offer made by a Lender or the request made by a prospective Borrower to the market. By itself, this document is not binding but merely publishes information enabling multiple parties to agree on mutually acceptable terms for a loan. |
| Bound Contract | This is a specialised type of Document that contains a formal agreement between the various Lenders/Borrowers/Guarantors setting out the terms of a loan between these actors. |
| Repayment Rule | This is a specialised type of Document that contains the formal definition of the rule that determines how to calculate one or more repayment against a loan. |
| Initiator | This is an actor/entity that is the first to create a loan offer/request onto the Blockchain. The invention described herein allows either the Borrower or the Lender to be the initiator for a particular loan. It should be noted that both the lender and the borrower can be the Initiator for a loan simultaneously; in this situation either party, or the Facilitator will detect the other parties Offer Request and mediate to create an acceptable loan contract. |
| Responder | This is an actor/entity that generates a response to a loan offer/request that has been generated by the Instigator |

We now outline the key concepts of an illustrative embodiment of the present invention. The example used herein relates to a lending process, but the invention is not limited in this regard. In brief, this illustrative embodiment provides a technical solution for allowing the publication of a prospective contract—from either a borrower or a lender—to a blockchain in manner that allows counterparties to bind to that contract, or offer alternative terms to that contract. Known solutions do not provide a technical mechanism for performing these operations in the manner described herein.

It should be noted that a contract will only be formed when mutually acceptable terms between the borrower and lender(s) are agreed on. If insufficient funds are put forward to meet a borrower's requirements, no contract is formed.

The key elements of the inventive process are outlined as follows.

The initiator publishes a proposed contract onto the Blockchain, the proposed contract states:
What they want to borrow;
The amount they want to borrow; and
The repayment frequency and terms.

The contract is published publically on the blockchain via a transaction which comprises a pointer or reference to the location of the contract and a hash of the contract. The contract itself is held off-block (i.e. not within the blockchain) and details could include the interest rates, location, and asset details. Therefore, in reality, the contract itself may not be published in the blockchain but represented and/or accessible via metadata in a transaction on the blockchain. The contract may be very complex but sortable based on the data provided. The contract itself may be held in a computer-based registry or repository which may, in some embodiments, be implemented as a Distributed Hash Table (DHT) with the hash of the contract serving as a look-up key.

In one example, peers would be able to use software tools to observe and search the blockchain to find a particular type of loan, look at their interest rates, and interrogate the payment schedule. Having access to this information allows potential investors to calculate the risk and decide on which contracts they wish to bid. In this way, the invention provides the significant benefit that information relating to loans or potential loans can be made easily and freely available.

Potential counterparties bid in one of two mechanisms:
1) either on the same basis as an assurance contract (although this is only viable where the borrower is the initiator); In the case of the assurance contract model, this means the borrower has only the set period defined in the contract to raise the funds. Take the example of a contract wishing to raise 15 bitcoins in 30 days. User A bids eight bitcoins, user B bids two bitcoins, and user C bids five bitcoins. Provided all three bids arrive within the 30 day period, the contract is valid. However if User C's bid is not forthcoming before the 30 day timetable, the contract ends and no further action is taken because only 10 Bitcoins have been pledged or:
2) using the same mechanism as the initiator, wherein a contract is broadcast to the blockchain. On a broadcast basis, the contract itself will determine the validity period of any offers made.

Once the total of all the bids equals the requested loan amount, the blockchain Transaction becomes valid. The validation process can be performed by informally circulating a copy of an incomplete (and therefore not yet valid) Transaction e.g. by publishing it to a publically accessible place such as a repository. Prospective lenders can then pledge currency such as BTC by taking a copy of the incomplete transaction and creating a new version that has (in separate Input sections of the Transaction) their pledged amount. The Transaction remains invalid until the total amount of all pledges reaches the threshold specified in the Output section. However, once the total exceeds the threshold the Transaction becomes valid and may be Broadcast to the network. This technique uses the 'ANYONE-CAN-PAY' flag.

In the present case, the smart contract is published to the Blockchain once it becomes valid. The Transaction includes:
The terms covered by a smart contract; and
The money, either in Bitcoin or tokenised format, is released to the borrower from the investors.

A loan note is issued detailing what has been borrowed. This is implemented as a Transaction. This is sent back to the borrower's Pay-to-Script Hash (P2SH) address. The borrower must provide a script that matches this hash address to enable them to spend the loaned money. The P2SH address also includes details of all the repayments. The details of the repayments are embedded as metadata in the redeem script.

If the contract includes regular repayments, a schedule of these is created. The P2SH address for each payment is created to repay the investors. For example, for a regular payment of one Bitcoin where User A puts in 50%, User B puts in 30%, User C puts in 20%, the following amounts are paid to each user:

User A: 0.5 Bitcoin
User B: 0.3 Bitcoin
User C: 0.2 Bitcoin

Each repayment is made in turn and the corresponding transaction timestamped in accordance with known blockchain techniques. The repayment could be split between the actual repayment amount and any interest incurred. This enables any party involved in the loan to see, via the blockchain, if and when a payment has been made. It is also possible for the borrower to pay a scheduled payment early and for this to be visible in the timestamp. Therefore, the invention provides an enhanced mechanism for sharing and exchanging loan-related data via a blockchain.

Some example scenarios are now provided for illustration only and are not intended to be limiting.

EXAMPLE SCENARIO ONE

Standard Loan with No Guarantor or Collateral

This scenario is described with reference to FIGS. 3 to 9. Suppose that Bob requires a loan of 10 bitcoins (BTC) but has no collateral to secure it. He requires the loan to have:

a one year rate
Monthly repayments
10% interest rate

Bob generates transaction metadata using a suitably programmed computing (client) device and provides the metadata in a pay-to-script-hash (P2SH) in a blockchain transaction as illustrated in FIG. 5. The metadata generated by Bob is illustrated in FIG. 3.

In such scenarios the borrower's own reputation is used as collateral. The prospective lenders have multiple routes to evaluate Bob's credit worthiness either using information supplied as part of the request document or directly from the Blockchain which would allow the loan to be advanced in a pseudo-anonymous manner. Methods of assessing credit worthiness are beyond the scope of the present invention, and the way in which the borrower's credit worthiness is assessed is not relevant herein.

Only when the required amount has been raised is a repayment schedule created, with the line of credit maintained in a two line signature address:

Borrower
Investor

Each of the monthly payments will be made to the investor's signature address. The payment amount is calculated according to the outstanding balance and interest to be paid. If the 10 bitcoins are not raised, the contract is deemed invalid.

Alice generates metadata indicating her willingness to lend 20 bitcoins for up to 60 months at a minimum interest rate of 9% with no collateral. The metadata generated in respect of Alice's willingness to enter into such an agreement is illustrated in FIG. 4.

Bob's desire to borrow the 10 bitcoins and Alice's willingness to lend 20 bitcoins are published as transactions to the blockchain, as set out in FIG. 5. The transactions generated in respect of Bob and Alice are matched and a contract is formed in the form of a loan advanced by Alice (see FIG. 6). Bob's repayment of the loan is shown in FIG. 8. FIG. 9 illustrates Alice receiving the repayment from Bob.

'Matching' may be interpreted as meaning that there is a mirroring of at least one item or element in the respective transactions i.e. there is correspondence between the respective transactions. The skilled person will understand that the matching process can be performed in a variety of ways. In one embodiment, it is performed using a simple algorithm whereby the Request-values from the borrower are matched up against the corresponding offer-values from the lender. This can be done by ensuring that the min-max ranges overlap (where the values are expressed in ranges) or that the actual values match up directly (i.e. that both request and offer are for BTC or both for a particular token, etc.).

SCENARIO TWO

Standard Loan with a Guarantor

Bob requires a loan of 10 bitcoins, but has no collateral to secure it. As he is aged 14 and therefore considered a minor, he does not have a strong Blockchain reputation. Instead Bob gets his mother, Eve, to act as a guarantor. The metadata illustrated in FIG. 10 is generated in order to describe this input. The information shown in FIG. 10, contained within the metadata, could be used to facilitate a check of Bob and Eve's reputation.

It should be noted that conditions of any type can be attached to the contract. This is achieved by maintaining a separate list of condition codes. In the example of FIG. 10, the condition code used to indicate 'guarantor' is (arbitrarily) set to '0x0003'. The first two bytes of the metadata indicate what the condition code is, and the rest of the metadata is formatted depending on the value of the condition code. The formatting is specified in the separate list of condition codes. In the example of FIG. 10, the next 20 bytes of metadata represent the hash of the guarantor's public key.

Only when the required amount has been raised is a repayment schedule created, with the line of credit maintained in a three line signature address:

Borrower
Investor
Guarantor

Each of the monthly payments is made to investor's signature address. The payment amount is calculated according to the outstanding balance and interest to be paid. If the 10 bitcoins are not raised, the contract is deemed invalid.

Alice generates metadata as shown in FIG. 11, indicative of her desire to lend 20 bitcoins for up to 5 years at a minimum interest rate of 9% with no collateral.

FIG. 12 shows the requests which are generated as a result of Bob indicating a desire to borrow 10 bitcoins and Alice indicating a desire to lend 20 bitcoins. The two requests are matched and then a contract is constructed. This contract is a loan of 10 bitcoins advanced by Alice. The loan is for 10 bitcoins at a rate of 9% per annum over 12 months. This is shown in FIG. 13.

Bob's loan drawdown is shown in FIG. 14. Bob's repayment is shown in FIG. 15. Alice's repayment is shown in FIG. 16.

EXAMPLE SCENARIO THREE

Using Assets as Collateral

Andrew wants to borrow 60 bitcoins in order to fund an extension being built on his house. He decides to put up 5% of the house's mortgage as collateral for the loan. Andrew is known by his ID, which is included in the metadata for his request. This makes it easy to establish what his credit rating is. Potential lenders are able to interrogate Andrew's key pair for previous blockchain transactions where he has borrowed money and repaid loans. From this they can decide if it is worth making a bid. The metadata for Andrew's request is shown in FIG. 17.

Ownership of the house's title deeds is tokenised (i.e. represented in metadata in a blockchain transaction) enabling users to easily swap ownership of the 5% mortgage. The system is then used to broadcast the need to raise the 10 bitcoin. Only when the required amount has been raised is a repayment schedule created, with the line of credit maintained in a two line signature address containing details of the Borrower and Investor.

When repayments are made, each of the lender addresses will be paid in the shares allocated for the investment. For example, if there are two lenders with a 60/40 split in the amount being lent, one lender would get 60% of the repayment and the other 40%. The redeemable contract links the repayment to the pay to borrower's script hash address.

Alice would like to lend 10 bitcoins up to 5 years at a minimum interest rate of 9% but would like security. The metadata generated by this request is shown in FIG. 18.

Figure 20:
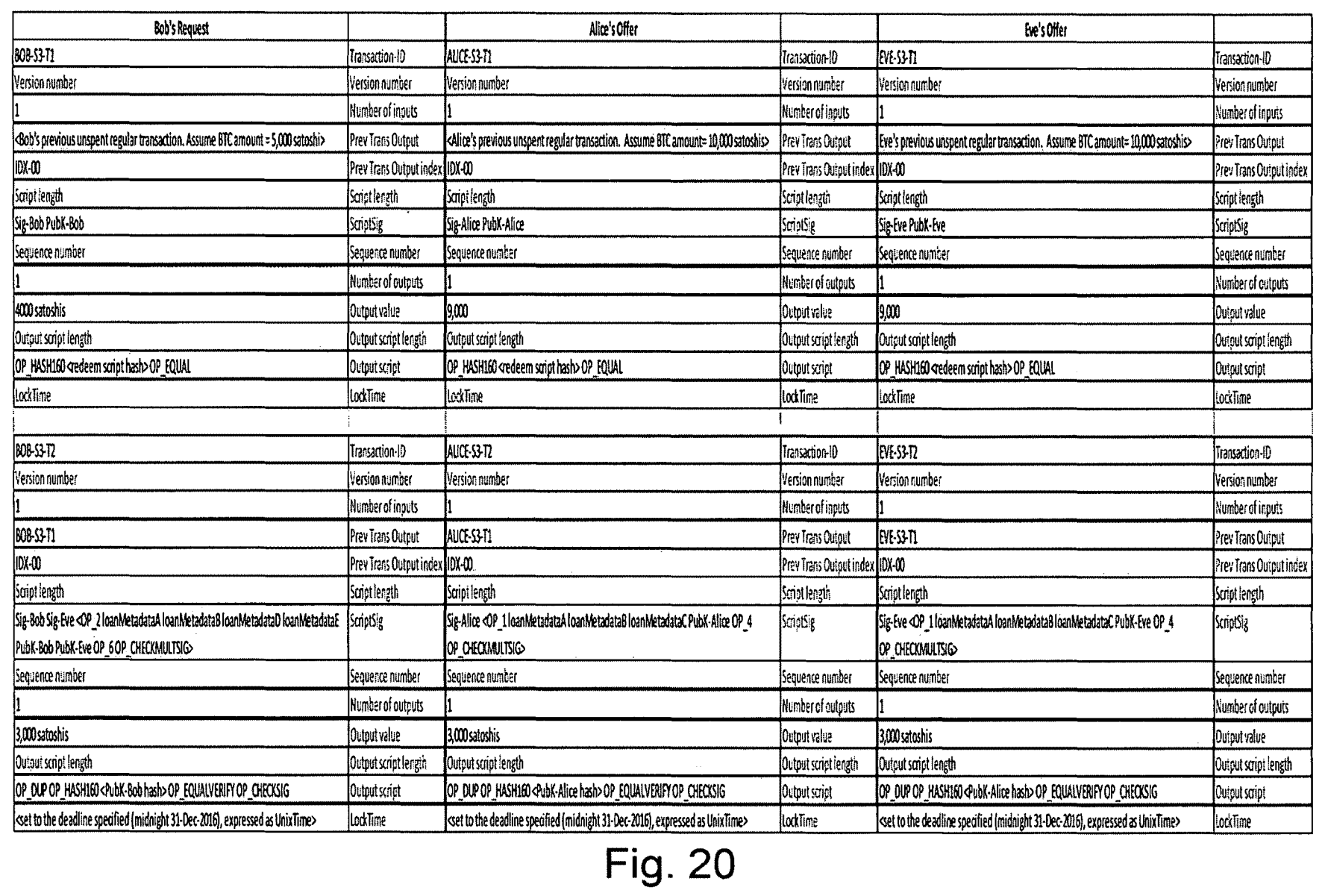

Eve would like to lend 20 bitcoins for up to 5 years at a minimum interest rate of 9.75%. The metadata generated for this request is shown in FIG. 19. The transactions generated by Bob, Eve and Alice are then matched off as illustrated by FIG. 20.

Bob then supplies collateral in a transaction as illustrated in FIG. 21. The advancement of the funds by Alice and Eve is shown by FIG. 22.

The drawdown of the advanced funds is shown in FIG. 23. The repayment of the loan by Bob is shown in FIG. 24.

The collection of the repayment by Alice and Eve is shown in FIG. 25. The reclaim of the collateral by Bob is shown in FIG. 26.

EXAMPLE SCENARIO FOUR

Borrowing Fiat Currency

Andrew wants to borrow £15,000 but wishes to manage his account via the Blockchain. The metadata generated in respect of Andrew's request is shown in FIG. 27. In this scenario, the Lender lends a tokenised currency rather than 'raw' Bitcoins to advance the funds.

Alice indicates in a request that she would like to provide a loan on the Blockchain for 12 months with monthly repayments at a rate no less than 10%. The metadata generated in response to this request is shown in FIG. 28.

Bob's request and Alice's offer are both published on the blockchain as shown in FIG. 29. The advancement of the funds from Alice is shown in FIG. 30. The drawdown of the loan by Bob is shown in FIG. 31.

The repayment of the loan by Bob is shown in FIG. 32. The collection of the repayment by Alice is shown in FIG. 33.

Technical Specification

At its simplest, a loan is an arrangement between a Lender and a Borrower for the Lender to advance money, or other asset, to the Borrower. The present invention utilises a blockchain as a technical vehicle for exchanging and publishing these assets and agreements. While the description herein focusses on the lending of BTC, or tokenised currency facilitated by BTC, it should be noted that the invention is not thus limited and other currencies or blockchain protocols may be used.

The invention may confer the following advantageous features, amongst others:

it enables offers and/or requests to facilitate a loan to be published onto the Blockchain, with supporting information held elsewhere;

it enables loan contracts to be published onto the Blockchain, with additional supporting information held elsewhere it enables multiple lenders to participate in a loan it enables multiple borrowers to participate in a loan it enables a borrower can underwrite a loan with one or more guarantors it enables a borrower to underwrite a loan through the provision of supporting collateral, where that Collateral can be hosted on the Blockchain, or outside it it enables a loan contract to have any nature of variable repayments, and repayment calculations specified against it and the system enables this underlying infrastructure to be implemented using the blockchain it enables competitive bidding between lenders to take place it enables competitive bidding between borrowers to take place it enables either the Borrower or the Lender to be the initiator for a particular loan.

We now describe a series of key use cases for the purposes of illustration.

Initiation of a Loan

A Borrower or Lender (initiator) wishes to publish an offer to the wider market about a loan that (s)he wishes to enter into.

TABLE 1

| Step | Details |
|---|---|
| 100.10 | To publish a loan offer, the Initiator creates a new Offer Request document which it publishes to a Repository either directly, or via a Facilitator. A secure hash of this Request document is created, plus the location of that document. Included within this document is information about: Initiator (either the Borrower or the Lender depending on which actor initiated the request) Loan Requested or Offered Repayment Terms Requested or Offered |
| 100.20 | This secure hash and location is used to create the relevant metadata blocks to include within the bitcoin offer transaction. |
| 100.30 | The Initiator then creates a new Redeem Script using this metadata plus their public key. This will be a m of n multi-signature transaction where: m is 1; and n is m plus the number of metadata blocks included. |
| 110.40 | The Initiator then creates a new Bitcoin transaction which is sent to the previously calculated redeem script. The value of BTC included within this transaction must be a minimum of the current dust value plus twice the minimum mining fee. |
| 110.50 | The Initiator then uses another transaction to reclaim the BTC back to the Initiator from the redeem address using, the metadata blocks plus signatures from the Initiator. This transaction then contains the information to trigger offers from other interested parties. The value of BTC included within this transaction must be a minimum of the current dust value plus the minimum mining fee. |

Extensions

There are two extensions to this use case:
[110] Request Loan with Guarantor; in this situation the request must come from a Borrower
[120] Request Loan with Collateral Variations This use case has a variation [105] where a Facilitator is involved in the management of the loan request. The scenario involves the following steps:

| Step | Details |
| --- | --- |
| 105.10 | Step 100.10 is amended such that it may be performed by the Facilitator using information supplied by the Initiator. |
| 105.30 | Step 100.30 is amended such that the transaction in this step uses the public key of the Facilitator rather than the key of the Initiator |
| 105.50 | Step 100.50 is amended such that this step is performed by the Facilitator to collect the BTC from the Initiator as their listing fee. The transaction can still be used by any prospective counterparties as before. |

Borrower Requests Loan with Guarantor

In this example use situation, the borrower wishes to supply information about guarantors that are prepared to underwrite the loan request.

| Step | Details |
| --- | --- |
| 110.10 | Step 100.10 is amended such that additional information is included within the Request document to include the following information: Guarantor(s) |
| 110.30 | Step 100.30 is amended such that the Borrower then creates a new Redeem Script using this metadata plus their public key and the public keys of each Guarantor included. This will be a m of n multi-signature transaction where:<br>   m is 1 plus the number of Guarantors; and<br>   n is m plus the number of metadata blocks included. |
| 110.50 | Step 100.50 is amended such that the Borrower and Guarantors then reclaim the BTC back to the Borrower from the redeem address using the metadata blocks plus signatures from the Borrower and each Guarantor. This transaction then contains the information to trigger offers from Lenders.<br>The value of BTC included within this transaction must be a minimum of the current dust value plus the minimum mining fee. |

Loan Request with Collateral

In this example the borrower wishes to include information about collateral they are prepared to offer as security to the prospective lenders.

The scenario is as described but with the following amendments.

| Step | Details |
| --- | --- |
| 120.10 | Step 100.10 is amended such that the Borrower includes the following additional information inside the Request: Collateral |

This use case has a variation [125] where the collateral being offered is managed directly on the Blockchain. The scenario is as described for [120] with the following amendments.

| Step | Details |
| --- | --- |
| 125.30 | Step 100.30 is amended such that in addition to the loan metadata, plus public keys, the metadata associated with the asset being offered as collateral is included as well. |

Monitoring a Blockchain

In this example a prospective loan participant, i.e. either a Borrower, a Lender or a Facilitator, needs to ensure that they are aware of new requests that are published onto the Blockchain.

TABLE 2

| Step | Details |
| --- | --- |
| 200.10 | Either the Responder or the Facilitator read the Blockchain to detect new transactions that contain the relevant metadata information identifying a loan request/offer.<br>Variation: This scan could use uncommitted transactions rather than monitor the published Blockchain itself. |
| 200.20 | Since the transaction metadata represents a generic contract, many transactions that include metadata will not be of interest to the Responder or Facilitator.<br>As a result, this step triages the transactions to actively discard those that do not meet the criteria defined by the Responder/Facilitator. |
| 200.30 | Where the metadata blocks do not contain enough information by themselves to determine whether a response should be generated, the Responder/Facilitator uses the contract link within the metadata to collect the structured offer/response document from the relevant Repository. |
| 200.40 | The Responder/Facilitator will now determine whether or not to proceed based on the information within the metadata and structured document. |

Responder Responds to Loan

In this example a responder wishes to respond to a loan offer and/or request that has been published in the Blockchain.

TABLE 3

| Step | Details |
| --- | --- |
| 300.10 | The Responder uses the information constructs a response to the offer request published on the Blockchain.<br>There is no requirement for the response to explicitly match the original request. |
| 300.10 | To publish a response, the Responder creates a new Offer Request document which it publishes to a Repository either directly, or via a Facilitator. A secure hash of this Request document is created, plus the location of that document.<br>Included within this document is information about:<br>   Reference to the original Offer Request document that triggered this response<br>   Responder (either the Borrower or the Lender depending on which actor initiated the request)<br>   Loan Requested or Offered<br>   Repayment Terms Requested or Offered |
| 300.20 | This secure hash and location is used to create the relevant metadata blocks to include within the bitcoin offer transaction. |
| 300.30 | The Responder then creates a new Redeem Script using this metadata plus their public key. This will be a m of n multi-signature transaction where:<br>   m is 1; and<br>   n is m plus the number of metadata blocks included. |
| 300.40 | The Initiator then creates a new Bitcoin transaction which is sent to the previously calculated redeem script.<br>The value of BTC included within this transaction must be a minimum of the current dust value plus twice the minimum mining fee. |
| 300.50 | The Initiator then reclaims the BTC back to the Initiator from the redeem address using the metadata blocks plus signatures from the Initiator. This transaction then contains the information to trigger offers from other interested parties. The value of BTC included within this transaction must be a minimum of the current dust value plus the minimum mining fee. |

There is one major variant to this use case where the response is (a) from a Lender and (b) a direct 1:1 match for the request (effectively a bilateral loan). In this situation, the Lender may actually advance the funds to a drawdown account in one step.

Matching Details

In this example, the Facilitator wishes to match prospective loan requests and/or loan offers to create a binding contract between the interested parties, in return for a payment for the Facilitator's services.

Main Success Scenario

TABLE 4

| Step | Details |
|---|---|
| 400.10 | Using information on offers & requests that have been published on the Blockchain, construct a ContractBinding document containing the details of a valid loan, including the following information within the document:<br>    Originating OfferRequest documents;<br>    Borrower Details;<br>    Any Guarantor Details;<br>    Any Collateral Details;<br>    Information about the funds to be advanced to the Borrower<br>    Information about the funds received from each Lender<br>    Information about the agreed repayment schedule |
| 400.20 | This ContractBinding document is published to a Repository and the hash of the document, plus the associated URI for its published location is retained. |
| 400.30 | The contract metadata for the loan is constructed from the ContractBinding document. Where funds other than BTC are being advanced, metadata detailing the assets being advanced are sourced. Where collateral managed on the Blockchain is being utilised, metadata detailing those assets are sourced. |
| 400.40 | A redeem script hash address for loan drawdown is constructed using a m of n multi-signature construct where:<br>    m is 2 plus<br>        the number of guarantors;<br>        the issuer of the asset being advanced (where required to transfer ownership);<br>        the issuer of the collateral being utilised (where required to transfer ownership)<br>    n is m plus:<br>        the number of metadata blocks associated with the loan referencing the ContractBinding document generated in 400.30;<br>        the number of metadata blocks associated with the asset being advanced; and<br>        the number of metadata blocks associated with the collateral.<br>The script itself will contain the following:<br>    metadata of the loan;<br>    (optional) metadata of the asset being lent;<br>    (optional) metadata of the asset being used as collateral;<br>    public key of the Borrower<br>    public key of the Facilitator<br>    (optional) public key of the Issuer of the asset being lent if required to facilitate transfer of that asset<br>    (optional) public key of the Issuer of the asset being utilised as collateral, if required to facilitate transfer of that asset |
| 400.50 | A transaction is published to each of the Lenders with no transaction inputs defined with the output defined as the address derived in step 400.40 above. |

Advancing Funds

In this example, the lender would like to advance the funds for the loan to the borrower such that they can only be drawn down in accordance with the agreed terms.

TABLE 5

| Step | Details |
|---|---|
| 500.10 | Each Lender receives an outline transaction from the Facilitator and allocates the relevant transaction inputs to cover the transaction, and then signs the transaction using their private key |

TABLE 5-continued

| Step | Details |
|---|---|
| 500.20 | Optional<br>If required to transfer ownership of the assets being transferred (for example where the loan is for anything other than BTC), the Lender gets the asset Issuer to countersign the transaction using the Issuer's private key. |
| 500.30 | Optional<br>Each lender may also create a reversing transaction for a given date/time in the future with the same inputs allocated in step 500.10 to recover the funds if not drawn-down by that time. This reversing transaction may also require signing by the Issuer of any underpinning assets. |
| 500.40 | The signed transaction(s) are then committed to the Blockchain which locks the funds into a drawdown account that requires the Borrower, Guarantors and Facilitator to sign to drawdown the funds. |

Advancing Collateral

In this example, the borrower would like to place the agreed collateral for the loan into an escrow facility in order to receive the loan.

TABLE 6

| Step | Details |
|---|---|
| 600.10 | The Borrower creates a new redeem script with a m of n multi-signature construct where:<br>    m is 2 plus:<br>        the count of the public keys required from the Lender(s). Note that this is probably only practical in a situation where the loan is bilateral (or has a limited number of lenders since the limit on signature numbers will be restrictive otherwise)<br>        (optional) the count of the public keys required by the Issuer of the underpinning asset<br>    n is m plus:<br>        count of the metadata blocks associated with the loan contract; plus<br>        count of the metadata blocks associated with the asset used as security |
| 600.20 | The Borrower creates a transaction, using the appropriate inputs from their portfolio to pay the collateral to this redeem script. The Borrower signs this transaction using their private key. |
| 600.30 | If the asset being transferred requires a signature from the Issuer then the Borrower forwards this transaction to the Issuer who signs it using their private key. |
| 600.40 | The transaction is then committed to the public Blockchain. |

Drawdown Advanced Loan Funds and Entering into the Loan Agreement

In this example the borrower wishes to drawdown the advanced funds and enter into the loan agreement.

| Step | Details |
|---|---|
| 700.10 | Once the Facilitator determines that enough funds have been advanced, then they will construct a drawdown transaction for the Borrower. The nature of this transaction will differ depending on whether the advance is of BTC, or an alternative asset managed on the Blockchain. |
| 700.20 | For a BTC loan transaction, the transaction output is sent to the Borrower's public key address. |
| 700.30 | For an asset loan transaction, a redeem script address is created using a m of n multi-signature construct where:<br>    m is 2 if the Issuer is required to countersign asset transfers or 1 otherwise<br>    n is m plus the count of the number of asset metadata blocks included within the transaction |
| 700.40 | The Facilitator then checks to determine that any collateral has been lodged within the approved escrow address by scanning the Blockchain for the committed transaction |

| Step | Details |
|---|---|
| 700.50 | Once the collateral has been lodged (or is not required), then the Facilitator signs the drawdown transaction, and passes the transaction to the Borrower to countersign |
| 700.60 | The Borrower countersigns the transactions and publishes it to the Blockchain. |

Repayment

In this example the borrower would like to make repayments against the loan in accordance with the agreed terms and conditions.

| Step | Details |
|---|---|
| 800.10 | Any of the parties engaged within the loan may take responsibility for the calculation of repayment amounts due. The assumption is that, for most loans, this would be undertaken by the Facilitator to simplify the model. In either situation, the next repayment is read from the metadata associated with the loan. Where the repayment schedule is complicated, this is determined from the ContractBinding document referenced within the metadata, although for simple loans the metadata itself can contain enough information to perform the calculation directly. |
| 800.20 | A repayment script address is generated for the borrower in the form of a m of n multi-signature address, where: m is 1, or 2 is there is a requirement for an Issuer to countersign asset transfers n is m plus the count of the number of loan metadata blocks plus the count of the number of asset metadata blocks The transaction itself includes the public key of the Facilitator plus optionally the public key of the Issuer if their authority is required for asset transfers. |
| 800.30 | A transaction, with no transaction inputs, is generated to pay the amount calculated in step 800.10 to the address calculated in 800.20 |
| 800.40 | The transaction is passed to the Borrower that enriches the outline transaction with details of the transaction inputs used which may also include adding a change output to the transaction. |
| 800.50 | The Borrower then signs the transaction |
| 800.60 | If required, the Borrower arranges for the Issuer to countersign the transaction |
| 800.70 | The transaction is published onto the Blockchain |
| 800.80 | The Facilitator then splits the repayment between the various Lenders in proportion to their ownership of the loan. For each Lender, the Facilitator creates a redeem script in the form of a m of n multi-signature where: m is 1, or 2 if there is a requirement for the Issuer to countersign asset transfers n is m plus the count of the number of loan metadata blocks plus the count of the number of asset metadata blocks The transaction itself injects the public key of the individual Lender plus optionally the public key of the Issuer. |
| 800.90 | The Facilitator then creates a repayment transaction for each Lender, and injects the loan and asset metadata (where applicable) before signing the transaction. |
| 800.100 | (Optional) Where asset transfers require the signature of the Issuer, then the transaction is passed to the Issuer to sign |
| 800.110 | The Facilitator publishes the repayment transaction onto the public Blockchain. |

Release Collateral

In this example the borrower would like to have the collateral that was used to secure the loan released once the terms of the loan have been fulfilled.

| Step | Details |
|---|---|
| 900.10 | Once the Facilitator completes the repayment schedule defined within the ContractBinding structure (or for simple loans within the metadata attached to the transaction itself), it will automatically release the collateral out of the escrow account. |
| 900.20 | The Facilitator will create a redeem script in the format of m of n where: m is 1, or 2 where the Issuer is required to countersign asset transfers n is m plus the count of the metadata associated with the asset The metadata of the asset, plus the Borrower's public key will be the source keys for the script. |
| 900.30 | The Facilitator will sign the redemption transaction with the metadata of the asset, the metadata of the loan and their public key. |
| 900.40 | (Optional) Where required, the Issuer will countersign the transaction. |
| 900.50 | The transaction will be published to the Blockchain to release the assets back into the control of the Borrower. |

Facilitator/Lender Merging

The above Use Cases describe the facilitator and the lender as separate entities. However, in a number of real-world scenarios, the facilitator and the lender could be the same entity. This does not alter the steps required but simplifies the development complexity.

Facilitator Removal

The use cases above rely on a Facilitator agent to broker the transactions between the lender and the borrower. Whilst in the above scenarios, the facilitator can be argued as adding material value to the process for both the lenders and the borrowers (in terms of facilitating a negotiation, and determining repayments), it is possible to use the Assurance Contract mechanism to advance funds directly from the lenders to the borrowers. In this scenario:

The borrower is responsible for generating the drawdown script address. As this is functionally deterministic, the lenders are also capable of validating that the script address generated matches the metadata associated with the proposed loan.

The lender's loan transaction is then tweaked slightly:

The lender's input is explicitly that of the loan being advanced with no change. This may require the lender to advance in two transactions; one to generate an output with the explicit target input value and then the second one to advance the loan The output value is the total value of the loan requested regardless of the amount of the advance from the given lender The input signature is signed using SIGHASH_ALL-|SIGHASH_ANYONECANPAY which means that signing is restricted to the lender's input and not all of the inputs for the transaction.

The Borrower can then drawdown the loan at any point when enough funds have been committed to the pool from various lenders.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method arranged to control a secure exchange and/or communication process conducted between at least two parties via a blockchain, the method comprising:
   hashing, by an initiating device, an exchange-related document associated with an offer, to produce a first hash;
   storing, by the initiating device, the exchange-related document with the first hash in a distributed hash table (DHT) stored separately from the blockchain;
   generating, by the initiating device, a first blockchain transaction for the offer, the first blockchain transaction comprising:
      a first redeem script comprising a cryptographic public key associated with the initiating device and a first output, the first output comprising first metadata that includes the first hash of the exchange-related document and a first location of the exchange-related document in the DHT;
      a redeem address; and
      a first amount of digital currency; and
   generating, by the initiating device, an incomplete second blockchain transaction to spend the first amount of digital currency to the initiating party from the redeem address using the first metadata and a digital signature from the initiating device;
   monitoring the blockchain to identify a third blockchain transaction comprising second metadata associated with a response, from a responding device, to the offer, wherein the third blockchain transaction comprises a second amount of cryptocurrency and a second redeem script, the second redeem script comprising a second cryptographic key associated with the responding device and a second output, the second output comprising the second metadata including a second hash of the response to the offer and a second location of the response in the DHT;
   validating the response to the offer and the second hash of the response to the offer at the second location in the DHT;
   in response to validating the response to the offer, generating an exchange schedule associated with the exchange-related document and/or the response, the exchange schedule comprising one or more exchanges and data relating to at least one exchange amount and/or at least one exchange date;
   generating a smart contract as a result of determining that the first hash in the first metadata associated with the offer matches the second hash in the second metadata associated with the response in the third blockchain transaction, wherein the smart contract comprises the exchange schedule; and
   generating a complete second blockchain transaction to spend the first amount of digital currency to the redeem address, wherein the input to the complete second blockchain transaction is based on the first output of the first blockchain transaction and the second output of the third blockchain transaction.

2. The computer-implemented method according to claim 1, further comprising:
   publishing the first blockchain transaction and the complete second blockchain transaction to the blockchain.

3. The computer-implemented method according to claim 1, wherein the exchange-related document is an invitation to perform a transfer between two or more parties.

4. The computer-implemented method according to claim 3, wherein the invitation comprises:
   information relating to a repayment schedule associated with the transfer; and/or
   a second party associated with the initiating device.

5. The computer-implemented method according to claim 1, further comprising:
   generating a P2SH address for each exchange in the exchange schedule.

6. The computer-implemented method according to claim 5, further comprising:
   publishing the complete second transaction to the blockchain to make an exchange of the one or more exchanges, in accordance with the exchange schedule, at a corresponding P2SH address.

7. The computer-implemented method according to claim 1, wherein the exchange-related document and/or response is a document stored in a digital format.

8. The computer-implemented method according to claim 1, further comprising monitoring the blockchain to identify at least one transaction comprising metadata associated with the exchange-related document and/or response.

9. The computer-implemented method according to claim 1, further comprising:
   monitoring the blockchain to identify at least one transaction comprising metadata associated with the exchange-related document and at least one transaction comprising metadata associated with the response; and
   comparing the metadata from the identified transactions to determine whether there is a correspondence between the metadata.

10. The computer-implemented method according to claim 1, wherein:
    the smart contract is associated with the initiating device and the responding device, and the smart contract comprises data relating to:
       the exchange-related document and/or the response;
       the initiating device and/or the responding device;
       a third-party device of a third party such as a guarantor and/or a facilitator;
       at least one asset to be transferred from one party to another; and
       a repayment schedule.

11. The computer-implemented method according to claim 10, further comprising:
    publishing the smart contract to a repository; and/or
    publishing a transaction to the blockchain, the transaction comprising a redeem script comprising at least one public key and a reference to the smart contract.

12. A computer-implemented system, comprising:
    a blockchain; and
    a plurality of computing devices arranged for communication with the blockchain, each computing device comprising at least one processor and at least one memory comprising executable instructions that, upon execution by the at least one processor of the corresponding device, cause the computer-implemented system to:

hash, by an initiating device of the plurality of computing devices, an exchange-related document associated with an offer, to produce a first hash;

store, by the initiating device, the exchange-related document with the first hash in a distributed hash table (DHT) stored separately from the blockchain;

generate, by the initiating device, a first blockchain transaction for the offer, the first blockchain transaction comprising:
- a first redeem script comprising a cryptographic public key associated with the initiating device and a first output, the first output comprising first metadata that includes the first hash of the exchange-related document and a first location of the exchange-related document in the DHT;
- a redeem address; and
- a first amount of digital currency; and generate, by the initiating device, an incomplete second blockchain transaction to spend the first amount of digital currency to the initiating party from the redeem address using the first metadata and a digital signature from the initiating device;

monitor the blockchain to identify a third blockchain transaction comprising second metadata associated with a response, from a responding device of the plurality of computing devices, to the offer, wherein the third blockchain transaction comprises a second amount of cryptocurrency and a second redeem script, the second redeem script comprising a second cryptographic key associated with the responding device and a second output, the second output comprising the second metadata including a second hash of the response to the offer and a second location of the response in the DHT;

validate the response to the offer and the second hash of the response to the offer at the second location in the DHT;

in response to validating the response to the offer, generate an exchange schedule associated with the exchange-related document and/or the response, the exchange schedule comprising one or more exchanges and data relating to at least one exchange amount and/or at least one exchange date;

generate a smart contract as a result of determining that the first hash in the first metadata associated with the offer matches the second hash in the second metadata associated with the response in the third blockchain transaction, wherein the smart contract comprises the exchange schedule; and generate a complete second blockchain transaction to spend the first amount of digital currency to the redeem address, wherein the input to the complete second blockchain transaction is based on the first output of the first blockchain transaction and the second output of the third blockchain transaction.

* * * * *